United States Patent
Hirzel et al.

(10) Patent No.: US 10,552,543 B2
(45) Date of Patent: Feb. 4, 2020

(54) CONVERSATIONAL AUTHORING OF EVENT PROCESSING APPLICATIONS

(71) Applicant: International Business Machines Corporation, Armonk, NY (US)

(72) Inventors: Martin J. Hirzel, Ossining, NY (US); Avraham E. Shinnar, Hawthorne, NY (US); Jerome Simeon, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/591,199

(22) Filed: May 10, 2017

(65) Prior Publication Data

US 2018/0329878 A1 Nov. 15, 2018

(51) Int. Cl.
G06F 17/27 (2006.01)
G10L 15/18 (2013.01)
G10L 15/22 (2006.01)

(52) U.S. Cl.
CPC ............ *G06F 17/279* (2013.01); *G10L 15/18* (2013.01); *G10L 15/22* (2013.01)

(58) Field of Classification Search
CPC .............................. G10L 15/18; G10L 15/22
USPC ...................................................... 704/9, 257
See application file for complete search history.

(56) References Cited

U.S. PATENT DOCUMENTS

| 6,173,266 | B1 * | 1/2001 | Marx ....................... G10L 15/22 704/270 |
| 7,137,099 | B2 | 11/2006 | Knight et al. |
| 8,352,908 | B2 | 1/2013 | Jhoney et al. |
| 8,677,333 | B2 | 3/2014 | Frank et al. |
| 8,775,389 | B2 | 7/2014 | Arcushin et al. |
| 8,805,675 | B2 | 8/2014 | Kaiser |
| 10,191,902 | B2 * | 1/2019 | Kumar .................. G06F 17/279 |

(Continued)

FOREIGN PATENT DOCUMENTS

WO    2008140797 A1    11/2008

OTHER PUBLICATIONS

Arasu, A., et al., "A Denotational Semantics for Continuous Queries over Streams and Relations", ACM SIGMOD Record, Sep. 2004, pp. 6-11, vol. 33, Issue 3.

(Continued)

*Primary Examiner* — Shaun Roberts
(74) *Attorney, Agent, or Firm* — Scully, Scott, Murphy & Presser, P.C.; Anthony R. Curro, Esq.

(57) ABSTRACT

A computer natural language conversational agent authors an event-processing rule by carrying out a dialog in natural language with a user. A data model that customizes a dialog and building of the event-processing rule is received. A partial tree data structure is constructed based on a rule's grammar, and specialized based on tokens extracted from the data model. An utterance is received from a user and interpreted according to the grammar as specialized to the data model. Based on the interpreting of the utterance, the grammar, the data model, and context of interactions with the user, a natural language prompt is determined for the computer natural language conversational agent to output to the user. The partial tree data structure is filled based on the natural language prompt and the utterance from the user. The event-processing rule is generated based on the partial tree data structure filled during the dialog.

20 Claims, 20 Drawing Sheets

(56) References Cited

U.S. PATENT DOCUMENTS

| | | | |
|---|---|---|---|
| 2002/0156616 A1* | 10/2002 | Russell | G06F 17/2765 704/4 |
| 2003/0110040 A1* | 6/2003 | Holland | G10L 15/26 704/275 |
| 2005/0261907 A1* | 11/2005 | Smolenski | G10L 15/22 704/270 |
| 2007/0156407 A1* | 7/2007 | Schedl | G10L 15/28 704/257 |
| 2007/0282593 A1* | 12/2007 | Thompson | G06F 17/2775 704/9 |
| 2014/0109046 A1* | 4/2014 | Hirsch | G06F 9/44 717/120 |
| 2014/0225724 A1* | 8/2014 | Rankin | G06F 3/048 340/438 |
| 2014/0297578 A1 | 10/2014 | Roshchin et al. | |
| 2016/0170714 A1 | 6/2016 | Siu et al. | |
| 2016/0260029 A1 | 9/2016 | Gelfenbeyn et al. | |
| 2016/0349935 A1 | 12/2016 | Gelfenbeyn et al. | |

\* cited by examiner

CONVERSATIONAL AUTHORING OF EVENT PROCESSING APPLICATIONS

FIELD

The present application relates generally to computers and computer applications, and more particularly to natural language processing and a bot or robot for conversational authoring.

BACKGROUND

Many sectors, from retail to transportation to health-care and beyond, are driven by continuous streams of input events. Computers process such events quickly and automatically, for example, based on event-processing rules, for example, authored by users. Implementing automated tools or computer systems that allow users to author event-processing rules, for instance, through natural language intuitively, remains a challenge. While event-processing rules may be written in a controlled natural language (CNL), users still need to learn the language in order to author the rules. Existing solutions to rule authoring have attempted to simplify event-processing rule language. However, oversimplification of rules limits their expressiveness. Other prior solutions for aiding the authoring of event processing rules include graphical interfaces and spreadsheets.

BRIEF SUMMARY

A method and system of providing a computer natural language conversational agent that authors an event-processing rule may be provided. The method, in one aspect, may include receiving a data model that customizes a dialog and building of the event-processing rule. The method may also include parsing the data model to extract tokens. The method may further include constructing a partial tree data structure based on a grammar and specializing the partial tree data structure based on the tokens extracted from the data model. The method may also include receiving a natural language utterance from a user. The method may further include interpreting the natural language utterance according to the grammar as specialized to the data model. The method may also include determining based on the interpreting of the natural language utterance, the grammar, the data model, and context of interaction with the user, a natural language prompt for the computer natural language conversational agent to output to the user. The method may further include filling the partial tree data structure based on the natural language prompt and the natural language utterance from the user. The method may also include repeating the receiving of the natural language utterance, the interpreting of the natural language utterance, the determining of the natural language prompt, and the filling of the partial tree data structure until the partial tree data structure represents a rule the user accepts. The method may further include generating the event-processing rule based on the partial tree data structure.

A natural language conversational agent system, in one aspect, may include a storage devices and at least one hardware processor coupled to the storage device. The at least one hardware processor may receive a data model that customizes a dialog and building of the event-processing rule. The at least one hardware processor may parse the data model to extract tokens. The at least one hardware processor may construct a partial tree data structure based on a grammar and specialize the partial tree data structure based on the tokens extracted from the data model. The at least one hardware processor may receive a natural language utterance from a user via a microphone coupled to the at least one hardware processor. The at least one hardware processor may interpret the natural language utterance according to the grammar as specialized to the data model. The at least one hardware processor may determine based on the interpreting of the natural language utterance, the grammar, the data model, and context of interaction with the user, a natural language prompt for the computer natural language conversational agent to output to the user. The determined natural language prompt may be output to the user. The at least one hardware processor may fill the partial tree data structure based on the natural language prompt and the natural language utterance from the user. The at least one hardware processor may repeat the receiving of the natural language utterance, the interpreting of the natural language utterance, the determining of the natural language prompt, and the filling of the partial tree data structure until the partial tree data structure represents a rule the user accepts. The at least one hardware processor may generate the event-processing rule based on the partial tree data structure.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
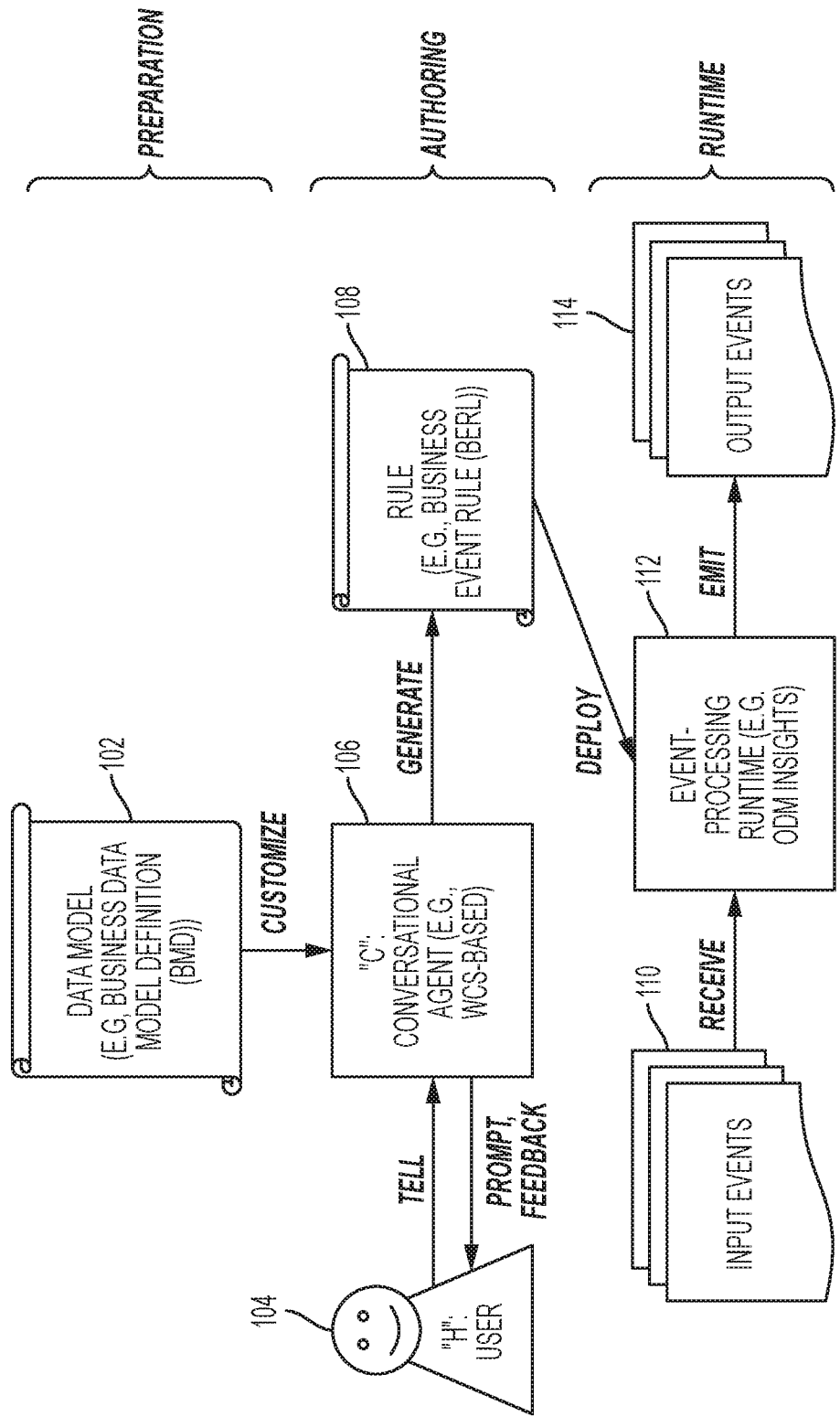
FIG. 1 is a diagram showing an overview for a conversational agent or a rule bot in one embodiment.

A system, method and techniques are disclosed that provide a solution of authoring event-processing rules via a natural-language conversation between the human and the computer. For example, a natural authoring interface (also referred to as a conversational agent or a rule bot (robot)) and/or computing environment in one embodiment of the present disclosure, allow a user to specify or author event-processing rules via a natural-language dialog. In one embodiment, the authoring environment guides this dialog with prompts. The specified rule may be used in a rule processing system to process input and generate output. The natural authoring interface allows domain experts to author complex event processing rules, and the resulting rule(s) may be echoed back in various forms, for example, controlled natural language (CNL), allowing the user to verify that the rule is as intended. In one embodiment, the natural authoring interface offers fine-grained, turn-by turn prompts and feedback, providing a dialog that bridges the gap from the colloquial natural language of the domain-oriented user to the controlled natural language of the rules. In this way, for example, the authoring interface or conversational agent of the present disclosure allows non-programmer users to be able to author event processing rules without having to learn a computer language.

In one aspect, natural language does not require the business user to learn the computer language. Instead, a conversational agent can understand free-flow colloquial utterances from the human. In the back-and-forth turns of conversation, a rule bot guides the human through providing all the relevant parts of an event-processing rule piece-meal. Because misunderstandings and mistakes may occur during the human-computer dialog, a conversational agent or rule bot in the present disclosure in one embodiment is implemented to quickly detect and correct such mistakes. For instance, a rule bot of the present disclosure in one embodiment is built with capabilities for help, confirmation, and repair. In one embodiment, a rule bot of the present disclosure may be built on a platform for conversational agents, for example, Watson Conversation Service (WCS) from International Business Machines Corporation (IBM®), Armonk, N.Y., which offers modules for natural language understanding (NLU) and low-level dialog flow. A rule bot of the present disclosure in one embodiment targets an event-processing platform. In the present disclosure, Operational Decision Manager: Decision Server Insights (ODM Insights) from IBM®, which offers CNLs and a runtime for event-condition-action rules, is described as an example of such event-processing platform. The CNLs serve multiple roles for a rule bot. They serve as input to the event-processing runtime, since they are unambiguous and runnable. They also serve in preparing the conversational agent, because they determine what information to prompt for in the dialog. They further serve in giving feedback to the human author, to answer the question "is this what you meant".

A rule bot of the present disclosure is enabled to carry on natural-language conversation for authoring event-processing rules. In one aspect, the rule-bot integrates natural-language conversation with CNL or like programming language to provide semantics and feedback.

The following gives an example for using a conversation to author an event-processing rule with a rule bot of the present disclosure in one embodiment. For explanation purposes, the description is provided with reference to ODM Insights example. The methodology of the rule bot, however, may be applied to another event-processing platform. The shown example (in Table 4) is a rule that was originally authored without the rule bot of the present disclosure. The following description shows how such rule may be authored with the rule bot of the present disclosure instead. The example is about handling credit card transactions and authorization responses, and is taken directly from the tutorial of the ODM Insights product documentation. This example is representative of the kind of rules users may want to create.

Table 1 shows an example dialog for rule authoring. This dialog has two participants: H and C. H refers to the human, i.e., the user (e.g., business or domain user) who wants to author an event-processing rule. C refers to the computer, i.e., the rule bot conversational agent that assists the human. In addition to the lines marked C, the computer also displays the rule being edited as shown in Table 2. This display keeps changing during the conversation, and includes automatically generated numbers for rule parts that the conversation can reference. For example, Line 8 of Table 1 references expr6 of Table 2. The computer prompts the human for each top-level clause of the rule: the event (Table 1 Lines 1-3), the condition (Lines 4-27), and the actions (Lines 28-38). Recursively, the computer prompts the human for other parts of the rule that have their own sub-structure, for example, setting each field of the emitted event in the actions.

TABLE 1

Credit card example dialogue.

1 C: Which input event should trigger the rule?
2 H: a transaction
3 C: Ok, transaction.
4 C: Is there a condition?
5 H: yes, a difference comparison
6 C: Ok, there is a condition for this rule
7 C: Alright, let's build an inequality condition
8 C: What is the left operand of the 'is not' operator (expr6)?
9 H: get the country code field
10 C: From which expression do we get field 'country code' (expr8)?
11 H: this transaction
12 C: What is the right operand of the 'is not' operator (expr7)?
13 H: the string "US"
14 C: Any other conditions?
15 H: yes, a more than comparison
16 C: Ok, there is an additional condition for this rule
17 C: Alright, let's build an greater than comparison
18 C: What is the left operand of the 'is more than' operator (expr12)?
19 H: get the amount property
20 C: From which expression do we get field 'amount' (expr14)?

TABLE 1-continued

Credit card example dialogue.

21 H: this transaction
22 C: What is the right operand of the 'is more than' operator (expr13)?
23 H: the integer 1000
24 C: An integer with value 1000
25 C: Any other conditions?
26 H: no
27 C: Ok no more condition
28 C: What kind of action would you like to add?
29 H: emit a new authorization response
30 C: Ok, I'm adding a new emit action.
31 C: What is the account of the authorization response (expr18)?
32 H: the value of the variable "the account"
33 C: What is the message of the authorization response (expr19)?
34 H: the string "R01: Out of country transaction greater than 1000"
35 C: What is the transaction of the authorization response (expr20)?
36 H: this transaction
37 C: Any other action?
38 H: no
39 C: Do you accept the rule 1?
40 H: yes
41 C: The rule is confirmed.

TABLE 2

Credit card event rule with numbers.

[{rule1}]
[{event2}when a transaction occurs, called 'the transaction']
[{cond9}if
   [{expr10}
     [{expr5}[{expr6}the country code of [{expr8}this transaction event]]
     is not [{expr7}"US"]] and
     [{expr11}[{expr12}the amount of [{expr14}this transaction event]]
     is more than [{expr13}1000]]]]
[{actions4}then
   [{action15}emit [{expr17}a new authorization response where
   the account is [{expr18}'the account'],
the message is
   [{expr19}"R01: Out of country transaction greater than 1000"],
the transaction is [{expr20}this transaction event]]];]]

The outcome of the conversation is an event-condition-action rule for ODM Insights, as an example. ODM Insights is in active use in a variety of domains. It is programmed via controlled natural languages (CNLs). While based on a natural language, CNL is more restrictive concerning lexicon, syntax, and/or semantics. It should be noted that CNLs are not necessary for the rule bot conversational approach of the present disclosure. ODM Insights has two CNLs that the rule bot of the present disclosure may utilize: Business Model Definition (BMD) and Business Event Rule Language (BERL). The following illustrates both CNLs with examples and explains how the CNLs connect with the rule bot of the present disclosure in one embodiment.

In one embodiment, most of the rule bot or conversational agent of the present disclosure is generic in the sense that it only needs to know about the general structure of a rule. In one embodiment, the only non-generic aspect of the conversational agent is its use of the data model. The data model determines what the conversational agent understands from human utterances; for example, transaction in Table 1 Line 3 is understood as an event type. The data model also determines what the conversational agent prompts the user for; for example, Table 1 Lines 31-36 prompt for the fields of an authorization response event. The event types and their fields are specified in the BMD in Table 3: Lines 5-8 define transaction and Lines 10-13 define authorization response.

TABLE 3

Credit card data model from ODM Insights tutorial.

1 an account is a business entity identified by an id.
2 an account has a status (an account status).
3 an account status can be one of: Excellent, Good, Fair, Poor, Risky.
4
5 a transaction is a business event time-stamped by a date.
6 a transaction is related to an account.
7 a transaction has an amount (a number).
8 a transaction has a country code.
9
10 an authorization response is a business event time-stamped by a date.
11 an authorization response is related to an account.
12 an authorization response has a message.
13 an authorization response has a transaction.

The data model in Table 3 defines entities and events, along with their fields and relationships, and auxiliary concepts such as enumerations. Business entities are state that ODM Insights maintains between events and uses for providing context to the processing of an event. Every business entity must have an identified by field, which the ODM Insights runtime uses to route events to that business entity. Every event must have a timestamped by field, whose type defaults to date&time unless explicitly specified otherwise. All other fields have a default type of string. Default types can be overridden by putting a different type in parentheses, e.g., (a number) in Table 3 Line 7.

TABLE 4

Credit card event rule from ODM Insights tutorial.

1 when a transaction occurs, called 'the transaction'
2 if
3    the country code of this transaction is not "US"
4    and the amount of this transaction is more than 1000
5 then
6    emit a new authorization response where
7    the account is 'the account',
8    the message is "R01: Out of country transaction greater than 1000",
9    the transaction is this transaction;

Table 4 shows the outcome of the dialog in Table 1, written as a rule in the BERL CNL of ODM Insights. It is similar to Table 2 but stripped of numbers. The BERL keywords when, if, and then introduce the event, condition, and actions clauses of the rule, respectively. ODM Insights also associates each event with a persistent business entity, in this case, 'the account'. Like BMD, BERL is a CNL designed to be readable by business users and unambiguously interpretable by the event-processing runtime. ODM Insights type-checks the BERL rule against the BMD data model and can run it with well-specified semantics. For example, consider the following input event:
{"type": "transaction", "date": "10:11",
   "account": "Alice",
   "amount": 1200, "country code": "US"}
This event does not satisfy the condition of the rule in Table 4 because the country code is "US". Therefore, this event does not trigger any action. On the other hand, consider the following input event:
{"type": "transaction", "date": "10:12",
   "account": "Bob",
   "amount": 1100, "country code": "DE"}
For this input the rule emits the following output event:
{"type": "authorization response", "date": "10:12",
   "account": "Bob", "message": "R01: Out of country transaction greater than 1000",
"transaction ": {" type": "transaction", "date": "10:12", "account": "Bob",
"amount": 1100, "country code": "DE" }}

FIG. 1 is a diagram showing an overview of architecture for a conversational agent or a rule bot in one embodiment of the present disclosure. In one embodiment the conversation agent may be implemented or run on platforms such as the Watson Conversation Service (WCS), which is a platform for creating conversational agents. The methodology of the present disclosure may also be based on other conversation service platforms. In this disclosure, terminology used in WCS is adopted only for explanation purposes. FIG. 1 shows architecture of a conversation agent that includes stages: (i) The preparation of the conversational agent; (ii) The authoring of business rules via the conversational agent; and (iii) The runtime where event-processing system, e.g., ODM Insights, executes the business rules to process events.

The preparation stage is an automated step that gets the conversational agent ready for rule authoring. The input is a business data model definition (BMD) file 102, which customizes the dialog to a particular data model. In general, conversational agents rely upon a natural-language understander (NLU) module, a natural language processing component that parses speech utterances. For example, in the case of WCS, NLU converts human utterances into NLU intents and NLU entities. An NLU intent captures how the human wants to influence the flow of the conversation; for instance, given the utterance "I want to specify a condition", NLU might detect a #cond intent. An NLU entity (not to be confused with a business entity) references a real-world concept; for instance, given the utterance "get the country code field", NLU might detect a @field: "country code" entity. WCS uses the sigils # and @ to indicate intents and entities, respectively. A task in the preparation stage is to turn BMD identifiers into NLU entity definitions. For example, the preparation stage may include receiving a data model related to a conversation, and parsing it to extract tokens or entities for use by components executing natural language processing techniques.

Figure 2:
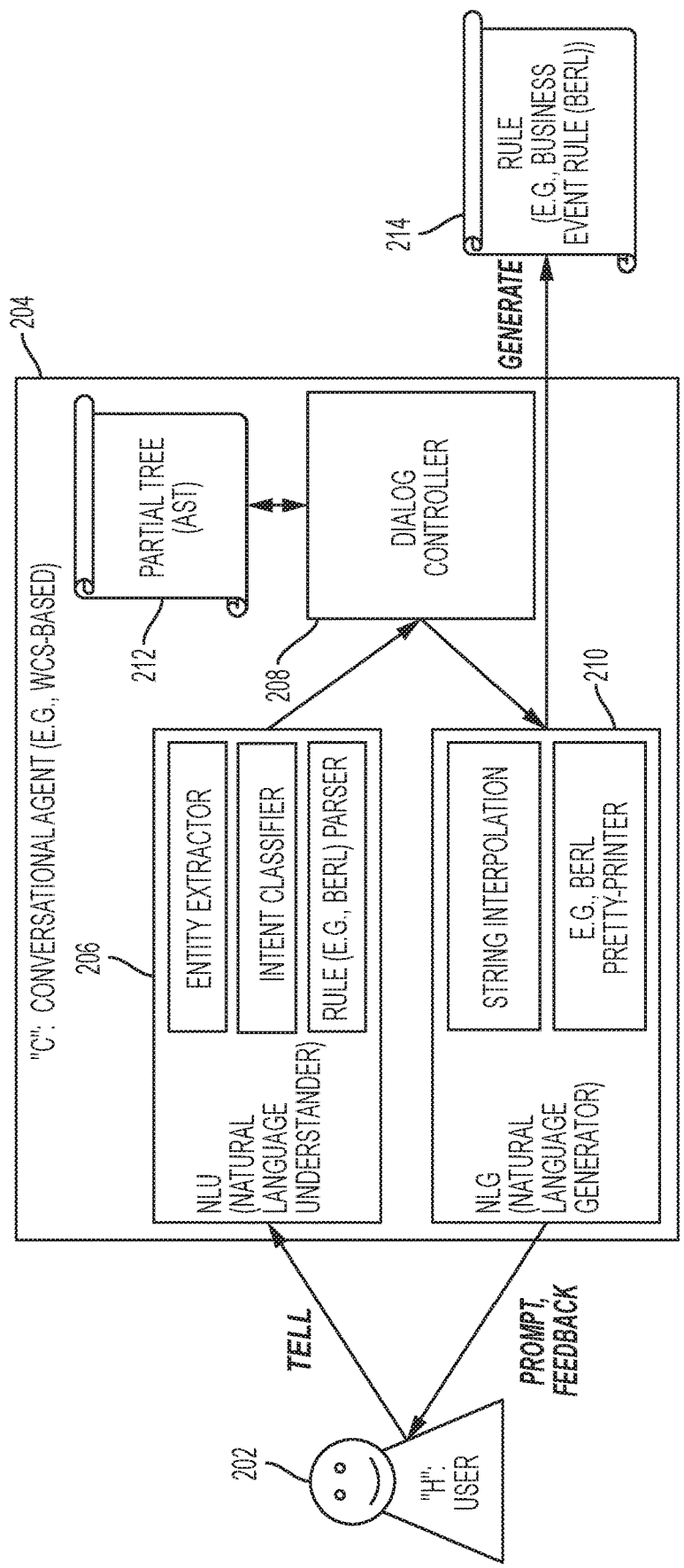
FIG. 2 shows details of the conversational agent in one embodiment.

The authoring stage is where the human ("H") 104 engages in a dialog with the conversational agent ("C") 106 to author a rule 108, for example, Business Event Rule Language (BERL) rule. FIG. 2 shows details of the conversational agent in one embodiment of the present disclosure. A dialog may start with the human 202 speaking a natural-language utterance to the computer 204. The utterance is received at NLU 206 and NLU 206 may tokenize the utterance, for example, into intent and entity. The tokenized utterance is transmitted to a dialog controller 208. The dialog controller 208 uses the natural-language generator (NLG) 210 to talk back to the human 202. The flow follows a general flow of conversational agents. Through the flow of the conversation, the dialog controller 208 fills in the pieces of the partial tree, including a partially filled-in abstract syntax tree (AST) 212 for a BERL rule 214. For rule bot, the NLU 206 and NLG 210 components can handle not only natural language but also BERL fragments. NLU 206 can detect BERL fragments in the input to short-circuit understanding. NLG 210 can generate BERL both for feedback to the human and for the final rule to be deployed on the event-processing runtime.

Referring back to FIG. 1, the runtime stage in one embodiment includes a continuous stream of input events 110 that feed into BERL rules 108 running on an event-processing system 112 such as ODM Insights, which emits a continuous stream of output events 114. Rule firings can also modify the persistent state kept in business entities. The methodology of the present disclosure may be also employed to generate rules for other event-processing platforms. In one embodiment, the runtime stage may be independent of the conversational origin of the rules, for example, the preparation and the authoring stages.

A dialog with a conversational agent or rule bot of the present disclosure authors a rule, for example, a BERL rule. While the dialog is in progress, the rule bot maintains a data structure that represents the rule under construction. In one aspect, both the flow of the dialog itself and its outcome may be driven by the shape of BERL rules. The following describes the partial tree 212 shown in FIG. 2, for example, its shape, how it tracks progress, and how it gets transformed as the dialog progresses.

In one aspect, a grammar for specifying rules may be provided. For example, as a controlled natural language (CNL), BERL is both controlled, implying it strictly follows a grammar, and at the same time is natural, and designed to look like a natural language. The entire BERL language, however, lacks a grammar. Table 5 shows the grammar provided in the present disclosure, in Backus Naur Form, using the following notational conventions. Non-terminal names, such as rule or printAct, start with a lower-case letter and are written in camel case. Verbatim tokens, such as 'when' or ',', are written in single quotes and type-writer font. Multi-valued tokens, such as EVENT, INT, or BINOP, are written in all capital letters. The start symbol is rule, including top-level clauses for event (when-clause), condition (optional if-clause), and actions (then-clause). There are four different kinds of actions: print a message, emit an event, define a variable, or set a field. And finally, a large portion of the grammar (everything after expr) is devoted to the syntax of expressions. The expression sub-language uses syntax reminiscent of natural language, and resembles expression languages found in conventional programming languages. The grammar may be extended, for instance, by capturing a richer set of expressions.

TABLE 5

Grammar for BERL subset.

rule ::= event cond actions
event ::= 'when' ('a'|'an') EVENT 'occurs' (',' 'called' VAR)?
cond ::= ('if' expr ('and' expr)*)?
actions ::= 'then' action+
action ::= printAct | emitAct | defAct | setAct
printAct ::= 'print' expr ';'
emitAct ::= 'emit' expr ';'
defAct ::= 'define' VAR 'as' expr ';'
setAct ::= 'set' FIELD 'of' VAR 'to' expr ';'
expr ::= getExp | aggExp | binExp | unExp | newExp | parenExp | thisExp | varExp | literal
getExp ::= 'the' FIELD 'of' expr
aggExp ::= 'the' AGGOP FIELD 'of' ('all'?) expr
binExp ::= expr BINOP expr
unExp ::= UNOP expr
newExp ::= 'a' 'new' CONCEPT 'where' setter (',' setter)*
parenExp ::= '(' expr ')'
thisExp ::= 'this' EVENT
varExp ::= VAR
literal ::= INT | REAL | STRING | BOOL | ENUMVAL | DATE | DURATION
setter ::= 'the' FIELD 'is' expr
BINOP ::= 'and' | 'or' | 'is' | 'is' 'more' 'than' | '+' | '−' | '*' | '/' | 'during' | ...
UNOP ::= 'not'
AGGOP ::= 'total' | 'average'

Figure 3:
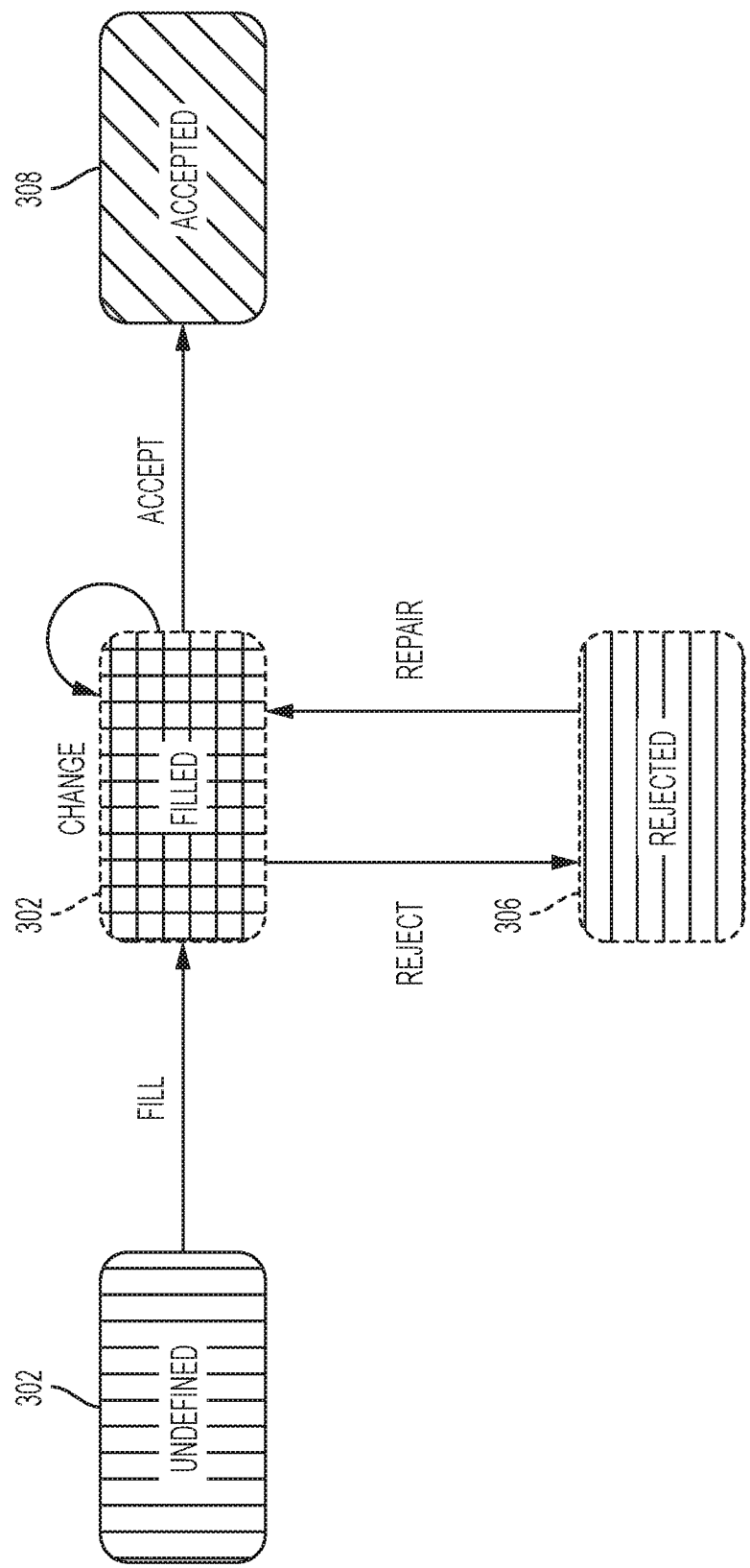
FIG. 3 illustrates a state machine for collected information in one embodiment.

All information collected by the dialog comes via human utterances, which go through NLU, and may include a degree of uncertainty. For a coherent dialog, the computer must understand the human correctly, and to increase its certainty, the computer can ask the human to accept or reject its understanding of their utterances. FIG. 3 illustrates a state machine for collected information in one embodiment of the present disclosure. The rule bot in one embodiment of the present disclosure uses the state machine shown in FIG. 3 to track its understanding of the human. For example, early in the dialog, the event clause of a rule might be in the undefined state 302. Later, after a few dialog turns, the rule bot might assume that the human wants to fill the event clause with "when a transaction occurs, called 'the transaction'", causing a state transition to the filled state 304. At this point, the rule bot might prompt the human for confirmation. If the human rejects the event clause, it transitions to the rejected state 306, and the rule bot prompts the human to repair it. On the other hand, if the human accepts the event clause, it transitions to the accepted state 308, and the dialog moves on to a different part of the rule.

Figure 4:
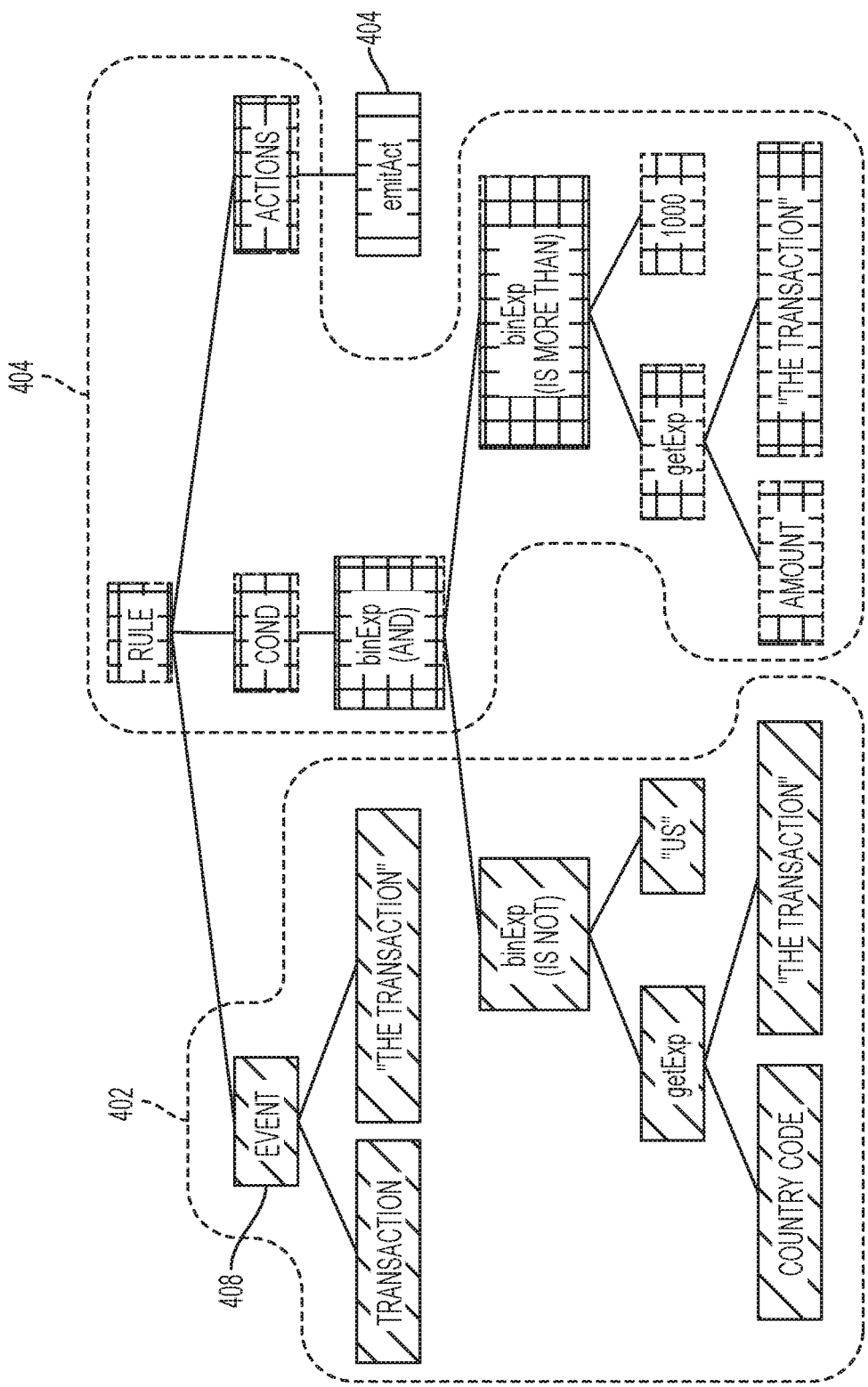
FIG. 4 shows an example partial tree under construction in one embodiment.

Referring back to FIG. 2, the partial tree, which is an abstract syntax tree (AST) under construction represents a central data structure in the rule bot. FIG. 4 shows example partial tree under construction in one embodiment of the present disclosure. Nodes in the partial tree correspond to non-terminals from the grammar, e.g., BERL grammar shown in Table 5. In one aspect, the rule bot adopts the common practice in compilers of not representing non-terminals for choices (such as expr) as separate nodes in the AST. Instead, the AST has a node for the chosen alternative (such as binExp). FIG. 4 indicates the state of each node, as one of the state machine states shown in FIG. 3. Nodes shown at 402 have reached the accepted state. Nodes shown at 404 are in the filled state. Node shown at 406 is in the undefined state. For example, the event node 408 has already reached the accepted state. The tree is partial in the sense that nodes that are marked undefined lack required children; for example, the undefined emitAct node 406 lacks its required expr child.

Figure 5:
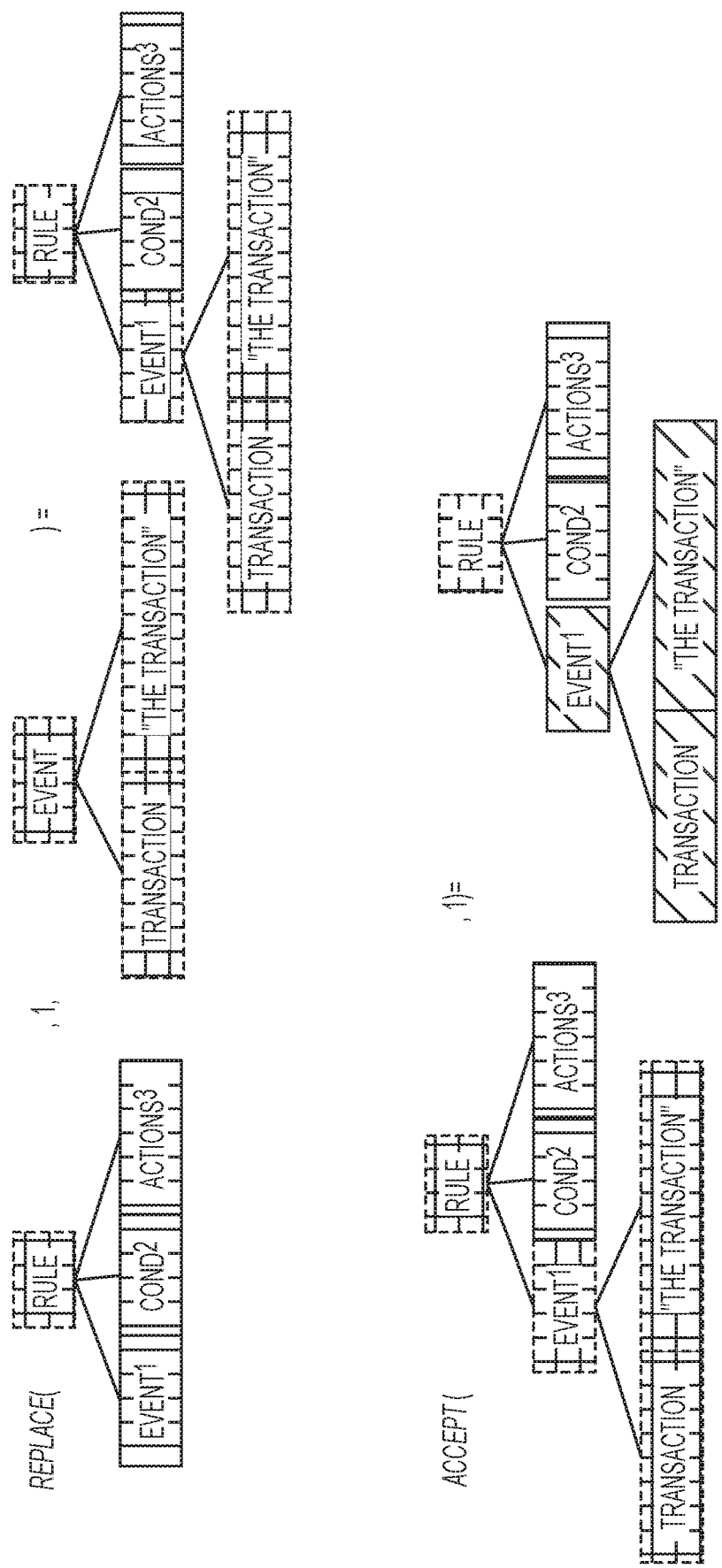
FIG. 5 shows instructions for tree transforms in one embodiment.

Over the course of the dialog, the rule bot updates the partial tree; the dialog succeeds if its outcome is a complete BERL rule that the human accepts. In one embodiment, a separate data structures may be introduced for representing tree transformations referred to as instructions. Instructions constitute a protocol by which components of the dialog controller communicate with each other. There may be two kinds of instructions: replace, which swaps out one subtree for a new one, and accept, which changes the state of a subtree to be accepted. FIG. 5 illustrates these two kinds of instructions using a concrete example. First, replace fills the event clause with a tree representation of "when a transaction occurs, called 'the transaction'". Then, accept transitions the event subtree to the accepted state. Instructions use numbers to identify nodes in the partial tree. For example, the event clause in FIG. 5 has number 1. Not all nodes carry a number: a granularity may be selected that allows for flexible tree editing without overwhelming the human with too many options in the dialog. Node numbers are stable: they do not change from one instruction to the other. Even though FIG. 5 shows all arguments to an instruction, their representation as a data structure elides the first argument, which is the global partial tree.

The following describes a dialog controller (e.g., shown at 208 in FIG. 2) and how it uses the partial tree to drive the conversation towards its desired outcome, a complete accepted rule, e.g., BERL rule.

The dialog controller drives the conversation until the rule is ready to be deployed. In one embodiment, the rule bot may be implemented using ReactiveML for the algorithmic and coordination parts and Watson Conversation Service for the conversation parts. To present the whole application within a single formalism, the methodology in the present disclosure uses hierarchical state machines.

Figure 6:
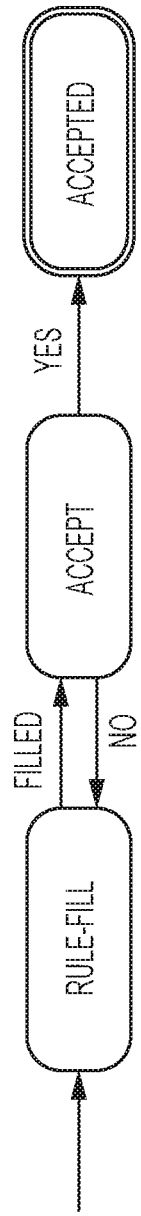
FIG. 6 shows a main state machine that coordinates the basic flow in one embodiment.
Figure 7:
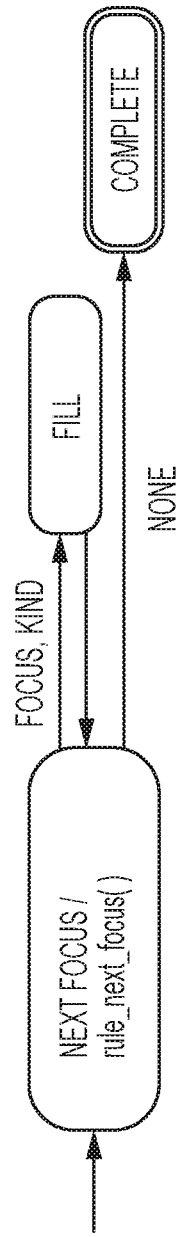
FIG. 7 shows a state machine for controller rule-fill state in one embodiment.
Figure 8:
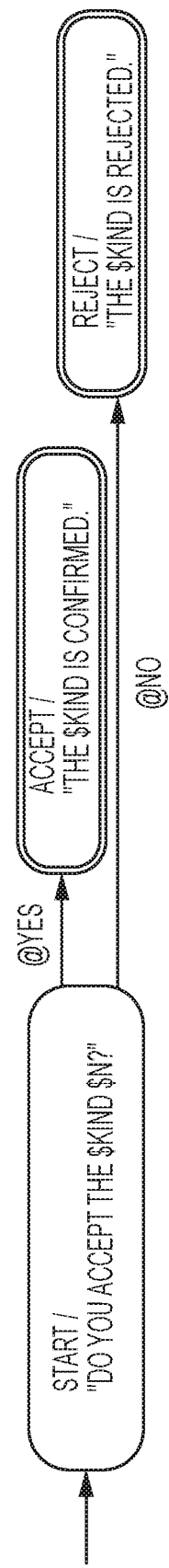
FIG. 8 shows a state machine for controller accept state in one embodiment.
Figure 9:
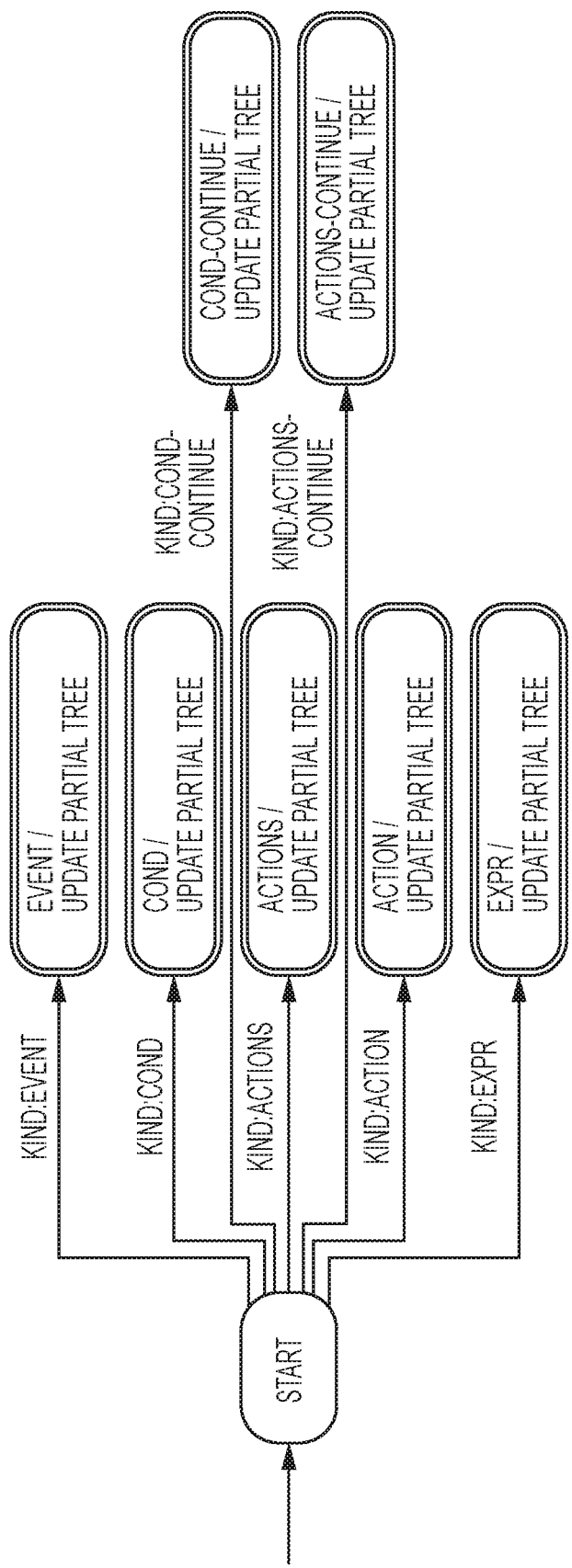
FIG. 9 shows a state machine for controller fill state in one embodiment.
Figure 16:
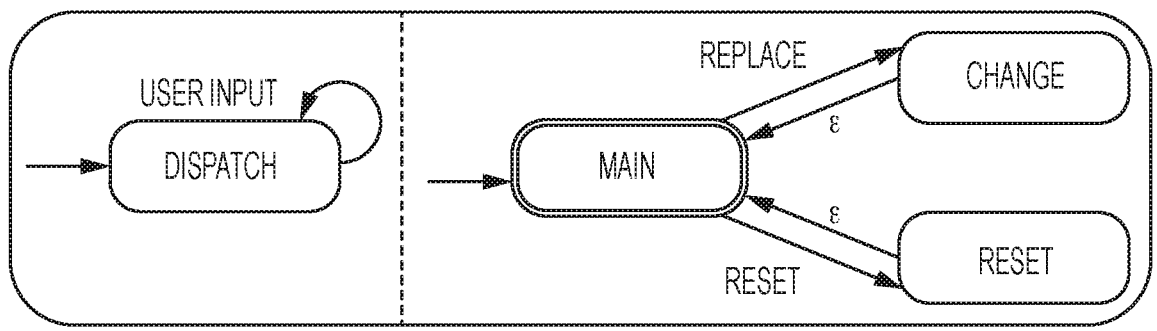
FIG. 16 illustrates a state machine for controller top-level in one embodiment.

State machines shown in FIGS. 6-9 coordinate the basic flow of the conversation, which is to fill all the nodes in the AST and then ask for confirmation that the rule is correct and ready for deployment. FIG. 6 shows a main state machine that coordinates the basic flow in one embodiment of the present disclosure. States are shown as rectangles with rounded corners labeled by their name, and transitions are shown as arrows labeled by their trigger. The start state, here rule-fill, has an incoming arrow that does not originate from another node. Final states, here accepted, have a double border. The state machine is hierarchical in the dual sense that first, individual states in FIG. 6 can contain state machines of their own, and second, the state machine itself constitutes a state in another one (FIG. 16). The rule-fill state corresponds to the state machine in FIG. 7. FIG. 8 shows a state machine for controller accept state. When an outer state machine reaches a state representing an inner state machine, it goes to the start state of the inner state machine. Conversely, when an inner state machine reaches a final state, it pops back out and takes a transition emanating from the corresponding state in the outer state machine.

The rule-fill state machine (FIG. 7) is a loop that first selects the next AST node to fill (next-focus state) and then updates the rule (fill state). Event-fill, cond-fill and actions-fill may operate based on a similar state machine. The next-focus state has a label of the form state-name/action, meaning that the action gets executed upon entering the state, in the fashion of a Moore Machine. In this case, the action includes calling a function, rule_next_focus( ), to select the next AST node to focus on. The node selection is based on the current partial AST and the previous node that has been filled. To build a natural conversation flow, a heuristic selects the first undefined or rejected node that followed the previously filled one in the pre-order of the AST. If there is no node to fill behind the one which has been just filled, then a node is searched to fill from the beginning of the rule.

The fill state machine (FIG. 9) drives the conversation to the sub-dialog that produces an AST of the expected kind. Depending upon the selected node, the rule bot constructs different kinds of subtrees to replace the undefined or rejected node. The kinds correspond to the different syntactic classes of the grammar. Each state of fill builds an AST of a different kind, and then uses it to create a replace instruction that updates the rule.

Figure 10:
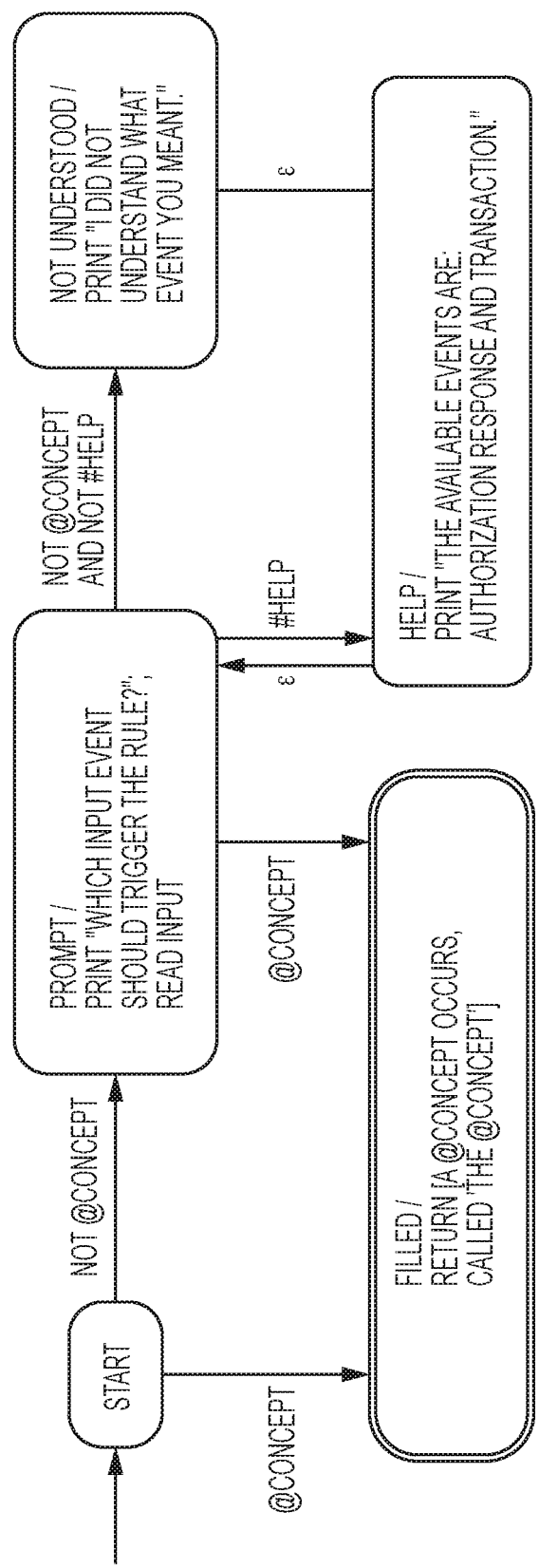
FIG. 10 shows a state machine for event non-terminal in one embodiment.

The state machines shown in FIGS. 10-17 build AST subtrees to be plugged into holes in the partial AST for the rule. FIG. 10 shows a state machine for event non-terminal. The event state machine shown in FIG. 10 is in charge of constructing the when-clause, which specifies the event that triggers the rule. It reacts to user inputs that have been processed by NLU. In the start state, given NLU entity @concept, it goes to the final state filled. If the NLU did not detect @concept, control goes to the prompt state that displays the prompt and then waits for the user to input another utterance. There are three transitions from the prompt state. Given NLU entity @concept, go to the filled state; given NLU intent #help, go to the help state; and given neither of the two, go to the not understood state. The not understood and help states display messages and loop back to prompt without further input (transitions). This two-loop structure is a common pattern for displaying contextual help. Moreover, the help message in this case is customized during the preparation phase based on the BMD (e.g., shown in FIG. 1 at 102). The final state filled builds and returns an AST subtree representing the when-clause of the rule. It is used in the event state of the fill state machine (shown in FIG. 9) to apply a replace instructions as described with reference to FIG. 5.

Figure 11:
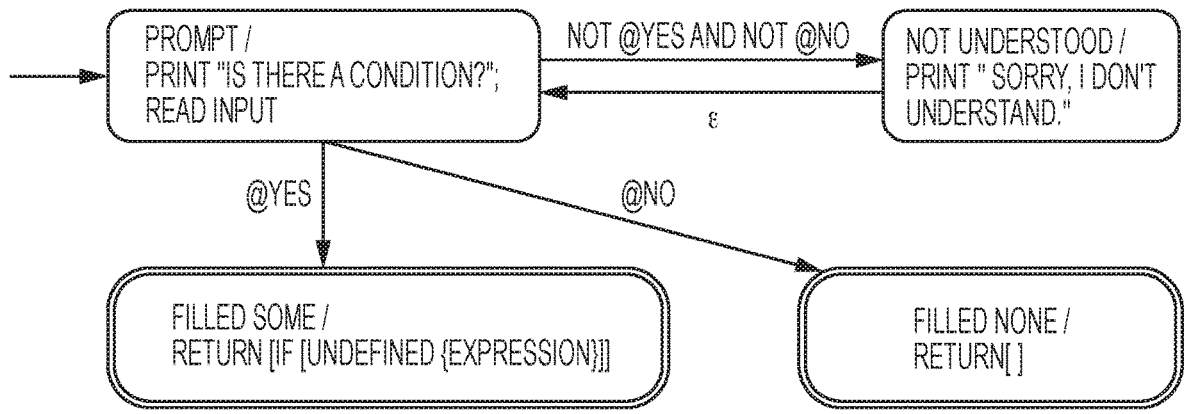
FIG. 11 shows a state machine for cond non-terminal in one embodiment.
Figure 12:
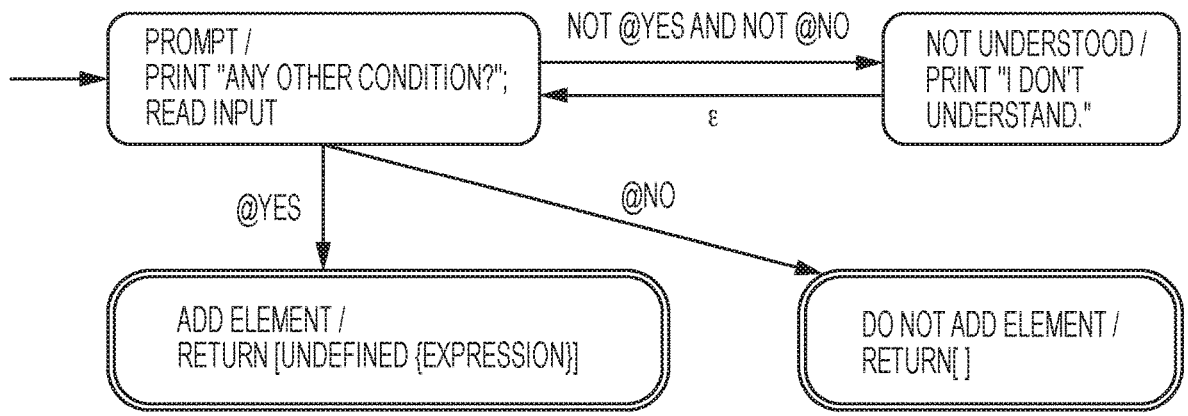
FIG. 12 shows a state machine for deciding whether to continue the list in the cond non-terminal in one embodiment.

The cond and cond-continue state machines shown in FIG. 11 and FIG. 12 construct the if-clause, which specifies the condition of the rule. As specified in the grammar (e.g., Table 5), the condition is an optional list of expressions. Therefore, the creation of the condition is split into two state machines. The first one, FIG. 11, asks if there is a condition. The second one, FIG. 12, adds elements to the list. In contrast to the event state machine that builds a complete subtree, these two state machines build subtrees that contain undefined expr nodes. The replacements of the new undefined nodes are going to be triggered by the rule-fill state machine.

Figure 13:
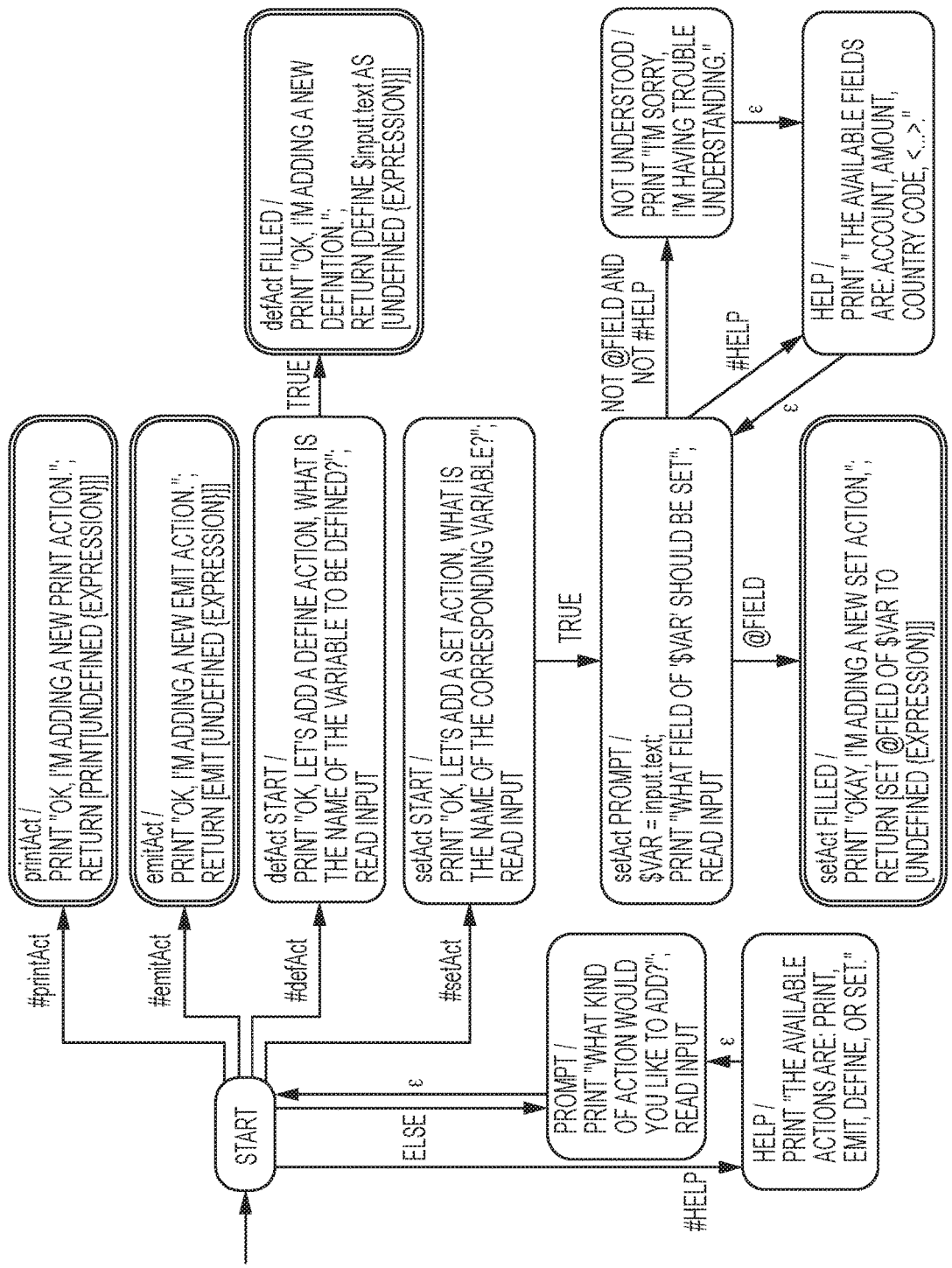
FIG. 13 illustrates a state machine for action non-terminal in one embodiment.

The action state machine shown in FIG. 13 constructs an action subtree. It uses four NLU intents for the four action types in the BERL grammar (print, emit, define, and set). This state machine also illustrates an embodiment of a design that the rule bot does not allow defining a variable or setting a field without immediately giving the name of the variable or field, because separating that step would be confusing.

Figure 14:
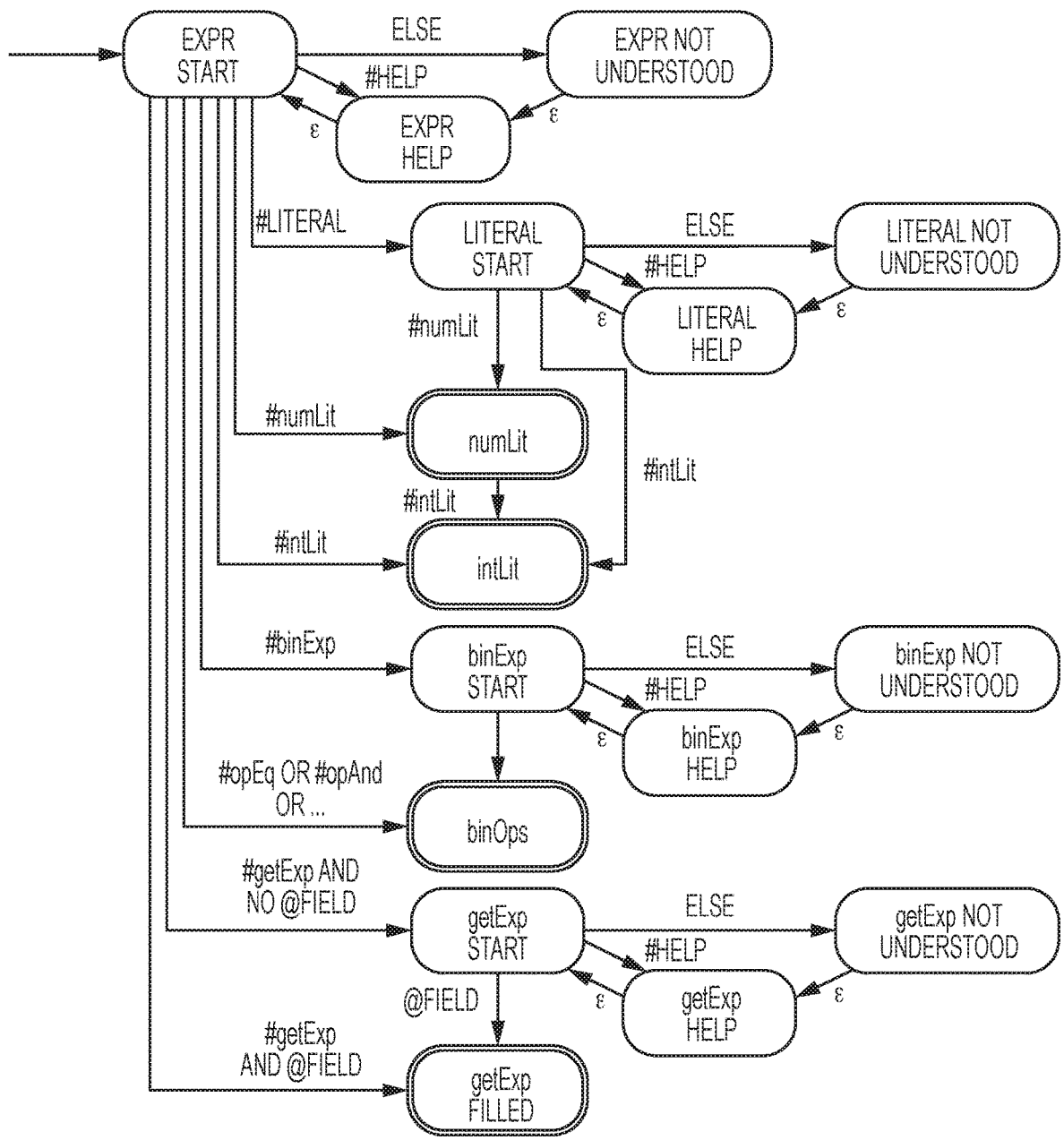
FIG. 14 illustrates a state machine for a representative subset of the cases of the expr non-terminal in one embodiment.

The expr state machine shown in FIG. 14 constructs an expr subtree. Since the BERL grammar defines many kinds of expressions, the full expr state machine is large. FIG. 14 only illustrate a few representative kinds (for instance, aggExp is not shown). Subordinate state machines (for instance, the numLit state corresponds to a state machine of its own), and actions (for instance, each help state displays information relevant in the given context) are also not shown. In one embodiment, the dialog offers refinement from the general to the specific (e.g., from expr to literal to numLit to intLit), but also short-circuiting if the human utterance permits (e.g., when the NLU intent was #intLit from the start). Because the full state machine is repetitive, an embodiment of the present disclosure may use code-generation macros to implement the state machine.

The conversational agent or rule bot of the present disclosure in one embodiment supports mixed-initiative dialog. In the above described state machines, the conversation flow was directed by the application (referred to as system initiative). For natural interaction with the rule bot of the present disclosure, the human is also able to pick the part of the rule they want to work on (referred to as user initiative). For instance, the human may want to seize the initiative to fill an undefined node or modify an existing node, and later cede the initiative again to let the rule bot guide them through authoring the rest of the rule.

Figure 15:
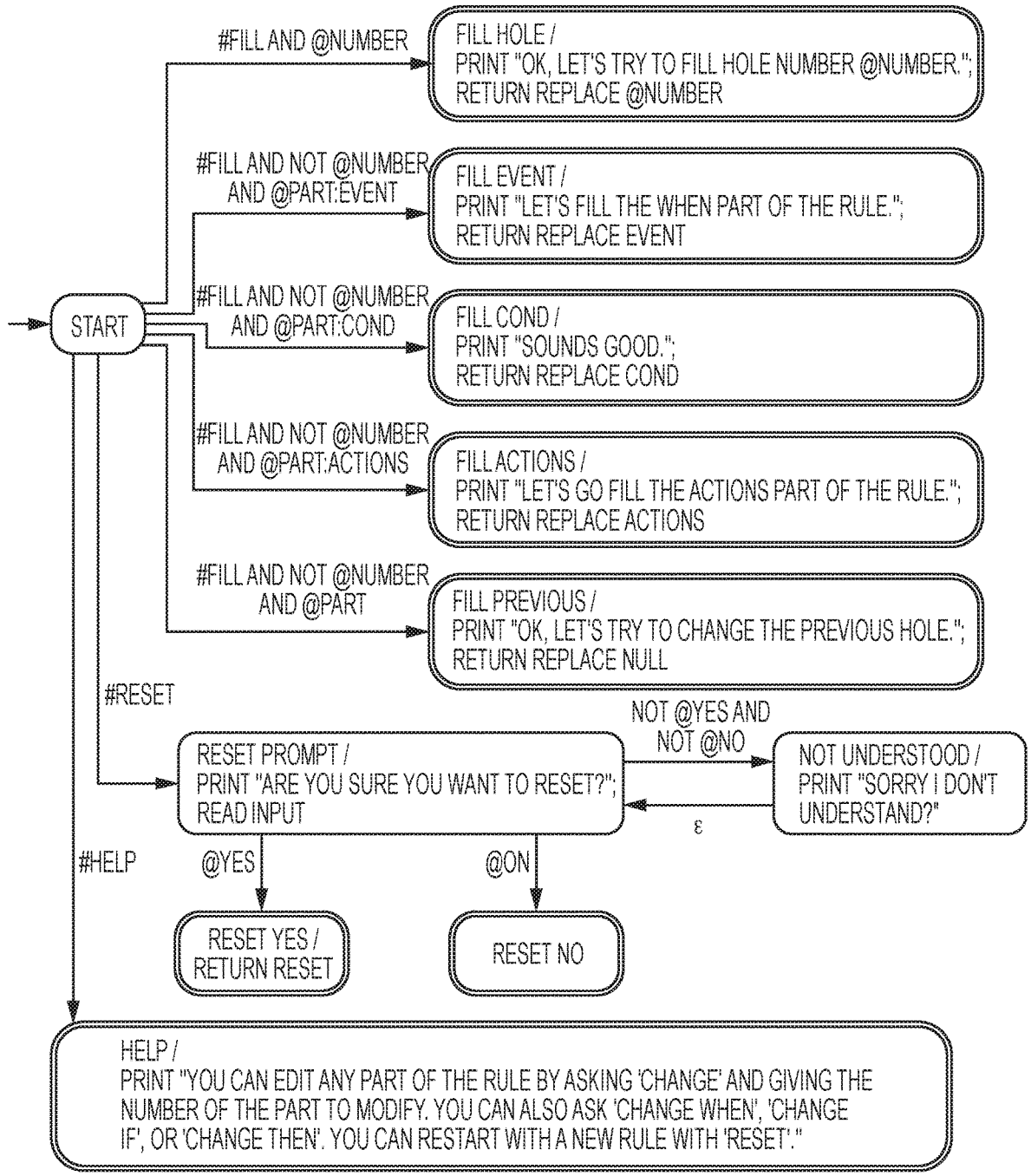
FIG. 15 illustrates a state machine for controller dispatch in one embodiment.

FIG. 15 shows a state machine for controller dispatch in one embodiment of the present disclosure. The dispatch state machine analyzes each user input and can trigger events that change the conversation flow. It detects the NLU intent #fill along with the AST node to modify. The AST node can be specified by an NLU entity @number or by the name of the part of the rule. This state machine can also generate a reset event. But this one is generated only after confirmation of the user. It also handles top-level help. Other NLU intents and NLU entities do not cause any state transitions in the dispatch state machine.

FIG. 16 shows a state machine for controller top-level in one embodiment of the present disclosure. The top-level state machine composes the dispatch state machine in parallel with the main state machine. Parallel composition, indicated by a dashed line, is a concept from hierarchical state machines. It means that at any given time, the system is in one state of the left state machine and in one state of the right state machine, simultaneously. Any event gets sent to both state machines and can cause transitions in either or both. Furthermore, the two state machines can communicate with each other. Specifically, the dispatch state machine can generate events that preempt the execution of the main state machine. For example, if dispatch generates the event reset, that causes a transition from the current active state in main to reset where the entire rule is set to undefined. Afterwards, control goes back to the start state of the main state machine.

Figure 17:
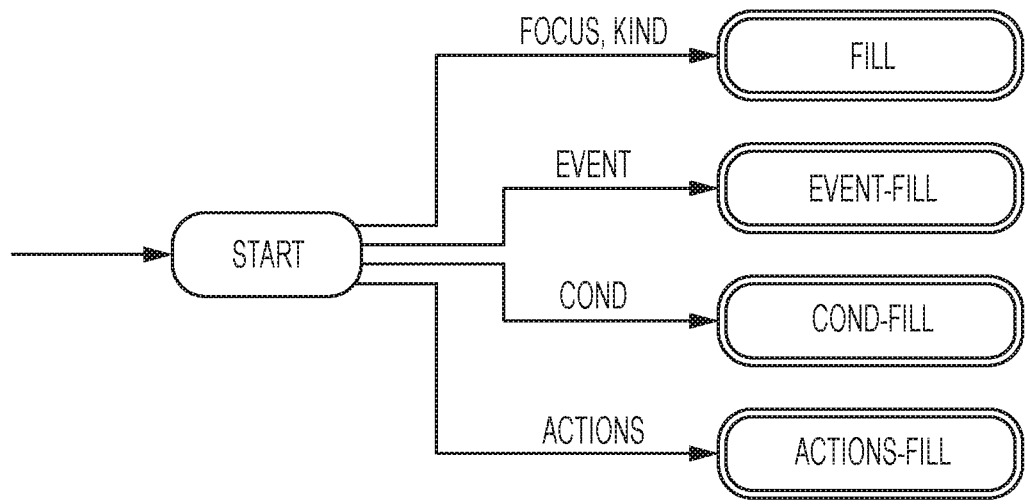
FIG. 17 illustrates a state machine for controller change in one embodiment.

FIG. 17 shows a state machine for controller change. The change state machine updates the AST node specified by the event generated by dispatch. If the node is specified by a number, only this node is updated using the fill state machine. But if dispatch requests the update of a clause of the rule, then that clause is updated until all the nodes of the subtree of the AST are filled. The state machines for event-fill, cond-fill, and actions-fill are similar to the rule-fill state machine in FIG. 7, except that the next node to fill is picked in the corresponding clause of the rule.

Out of the description of the rule bot controller, patterns can be identified for building a conversational agent from the grammar of a language. A product in the grammar, like rule or binExp (shown in Table 5), is represented in the AST as a node that contains children that can be undefined. The iteration on the AST to fill all the nodes (as in the rule-fill state machine, shown in FIG. 7) drives the conversation to handle this case.

An optional element in the grammar introduces a yes/no question. If the answer is yes, then an undefined node is put in the AST and once again, the loop over the AST is going to fill this element. The cond state machine (shown in FIG. 11) is an example for this construct.

For a list production, the node containing the list has a flag indicating whether the user no longer wants to add elements anymore. While this flag is undefined, the question about adding elements can be asked with a state machine like cond-continue (shown in FIG. 12). Once the flag is defined, the question is not asked anymore.

For alternatives in the grammar, like action or expr (shown in Table 5), the cases are distinguished via NLU intents and NLU entities. The action state machine (shown in FIG. 13) shows how this works. In addition to the above-listed patterns for handling grammar features, there may be other recurring patterns such as the contextual help or the reuse of sub-dialog at several levels of a conversation flow.

The following describes the NLU and NLG components in natural language processing in one embodiment of the present disclosure. The conversation agent or rule bot of the present disclosure in one embodiment, rely upon natural language processing for both input and output. The following describes the NLU component for input and the NLG component for output shown in FIG. 2.

The natural language generation (NLG) component (e.g., FIG. 2 at 210) generates prompts and feedback for the human. Prompts may include hard-coded strings, such as "Which input event should trigger the rule?". Other prompts may be derived from the BMD in the preparation stage shown in FIG. 1, such as help prompts that list available fields for a getExp. Prompts may utilize string interpolation, which is a hard-coded string with a dynamically determined piece, such as "Do you accept the $kind $n?". Feedback uses pretty-printed BERL rules with numbered parts, based on the grammar (e.g., shown in Table 5).

Figure 18:
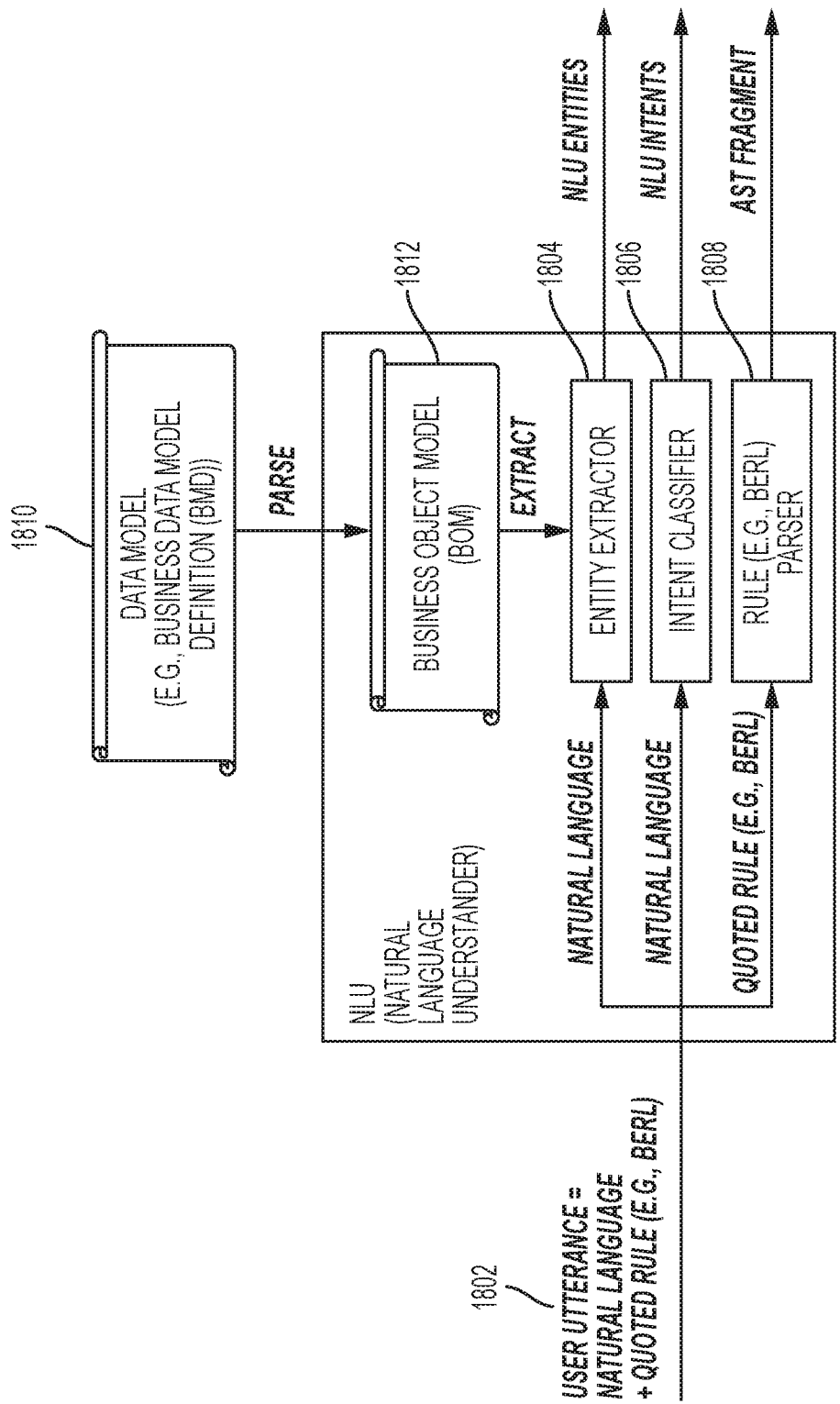
FIG. 18 shows natural language understanding (NLU) components in one embodiment.

The natural language understanding (NLU) component (e.g., FIG. 2 at 206) is responsible for the initial processing of the user input. FIG. 18 shows NLU's internal components in one embodiment of the present disclosure. The rule bot in one embodiment handles user input that can combine natural language text and rule (e.g., BERL) expressions 1802. The combined ability provides for a smooth transition between free natural language and controlled natural language. For example, BERL expressions are quoted in markdown style with backticks so the parser can identify them. Those two parts of the user input are treated through different subsystems. The natural language part is processed using an entity extractor 1804 and an intent classifier 1806. The quoted expressions are parsed by a parser (e.g., BERL parser) 1808 using the grammar (e.g., BERL grammar shown in Table 5) to produce an AST fragment, using the data structure described above.

NLU intents are denoted with a hash-sigil (#). The rule bot has NLU intents for BERL grammar non-terminals, such as #printAct, #emitAct. These drive dialog choices, for example, shown in FIG. 13. In addition, the rule bot has intents for mixed-initiative dialog, such as #fill, #help, and #reset, for example, as shown in FIG. 15. NLU intents may be detected via natural-language classifiers trained from example utterances.

NLU entities are denoted with an at-sigil (@). In WCS, an entity represents a class of objects or a data type that is relevant to a user's purpose. The rule bot in one embodiment uses the following three kinds of NLU entities:

- Built-in NLU entities that are predefined in WCS, e.g., @sys-number to automatically extract numbers from the user input.
- General-purpose NLU entities that are shared across multiple finite state machines, e.g., @yes and @no for extracting yes/no answers from the user input.
- Application-specific NLU entities that are extracted from the BMD file. Those correspond to schema or data model information and are specific to a given application domain. They guide the human during rule construction and for correction.

In the last category, the BMD file 1810 is parsed and then exported into a format 1812 understood by a conversation service platform such as WCS. Table 6 shows the subset of the BMD grammar that the rule bot may support. BMD files may be composed of sentences which are declarations for business events, business entities, enumerations, or fields. Business entities for ODM Insights are distinct from NLU entities for WCS. A business event is declared with its name, the business event it is derived from, and a timestamp field. A business entity is declared with its name, the business entity it is derived from, and an id field. An enumeration is declared by listing the various values it can hold. Fields of business events or business entities are declared with a name and a type.

TABLE 6

Grammar for BMD subset

```
spec       ::= (decl '.')
decl       ::= eventDecl | entityDecl | enumDecl | fieldDecl
eventDecl  ::= ('a'|'an') EVENT 'is' ('a'|'an') EVENT
               ('time-stamped' 'by' field)? ('with' fields)?
```

TABLE 6-continued

Grammar for BMD subset

```
entityDecl ::= ('a'|'an') ENTITY 'is' ('a'|'an') ENTITY
               ('identified' 'by' field)? ('with' fields)?
enumDecl   ::= ('a'|'an') TYPE 'can' 'be' 'one' 'of' ':' enumValues
enumValues ::= literal (',' literal)*
fieldDecl  ::= ('a'|'an') CONCEPT 'has' ('a'|'an') field
fields     ::= field (',' field)*
field      ::= ('a'|'an') FIELD ('(' fieldType ')')?
fieldType  ::= 'integer' | 'string' | 'boolean' | 'date' | 'time' |
               'date' '&' 'time' | ('a'|'an') TYPE
```

After parsing the BMD, the rule bot represents it as a "Business Object Model" (BOM), which is a simple object type representation. The rule bot extracts concept names, field names, and enumeration values to prepare the NLU entity extractor. The NLU entity extractor is then trained so it can extract those NLU entities from the user input. As an example, for the credit-card BMD file shown in Table 3, the rule bot extracts the following NLU entities:

@concept: account, account status, authorization response, transaction

@enum: Excellent, Fair, Good, Poor, Risky

@field: account, amount, country code, date, id, message, status, transaction

The rule bot in one embodiment of the present disclosure utilizes preparation based on the data schema, and can mix and match CNL with natural language, both during parsing and pretty-printing.

The following shows other example dialog authoring examples using the rule bot of the present disclosure. Those other examples use various other features of BERL and BMD.

Table 7 shows a rule bot dialog for an insurance example based on a talk by Backhouse. The numbers refer to parts of the resulting BERL rule in Table 8, and the BMD data model is shown in Table 9. Like in the credit-card example, the rule has an emitAct to emit an event. But unlike in the credit-card example, the data model showcases inheritance, which is handled by the preparation stage of rule bot.

TABLE 7

Insurance example dialog.

1 C: Which input event should trigger the rule?
2 H: an accident
3 C: Ok, accident.
4 C: Is there a condition?
5 H: yes, a boolean disjunction
6 C: Ok, there is a condition for this rule
7 C: Alright, let's build an Boolean disjunction
8 C: What is the left operand of the 'or' operator (expr6)?
9 H: an equality comparison
10 C: Alright, let's build an equality condition
11 C: What is the left operand of the 'is' operator (expr8)?
12 H: the severity property
13 C: From which expression do we get field 'severity' (expr10)?
14 H: this accident
15 C: What is the right operand of the 'is' operator (expr9)?
16 H: the fatal enumeration
17 C: What is the right operand of the 'or' operator (expr7)?
18 H: another equality comparison
19 C: Alright, let's build an equality condition
20 C: What is the left operand of the 'is' operator (expr11)?
21 H: get the severity field
22 C: From which expression do we get field 'severity' (expr13)?
23 H: this accident
24 C: What is the right operand of the 'is' operator (expr12)?
25 H: the injury enumeration
26 C: Any other conditions?

TABLE 7-continued

Insurance example dialog.

27 H: no
28 C: Ok no more condition
29 C: What kind of action would you like to add?
30 H: emit a new ambulance call
31 C: Ok, I'm adding a new emit action.
32 C: What is the address of the ambulance call (expr17)?
33 H: the address field
34 C: From which expression do we get field 'address' (expr21)?
35 H: this accident
36 C: What is the car of the ambulance call (expr18)?
37 H: the variable "the car"
38 C: What is the customer of the ambulance call (expr19)?
39 H: the customer field
40 C: From which expression do we get field 'customer' (expr22)?
41 H: "the car" variable
42 C: What is the description of the ambulance call (expr20)?
43 H: string "Ambulance required: accident/injury."
44 C: Any other action?
45 H: no
46 C: Do you accept the rule 1?
47 H: yes
48 C: The rule is confirmed.

TABLE 8

Insurance event rule.

```
1  [{rule1}
2  [{event2}when a accident occurs, called 'the accident']
3  [{cond3}if
4    [{expr5}[{expr6}
5      [{expr8}the severity of [{expr10}this accident event]]
6      is [{expr9}fatal]]
7    or [{expr7}[{expr11}the severity of [{expr13}this accident event]]
8      is [{expr12}injury]]]]
9  [{actions4}then
10   [{action14}emit [{expr16}a new ambulance call where
11     the address is
12       [{expr17}the address of [{expr21}this accident event]],
13     the car is [{expr18}'the car'],
14     the customer is [{expr19}the customer of [{expr22}'the car']],
15     the description is
16       [{expr20}"Ambulance required: accident/injury."]]];]]
```

TABLE 9

Insurance data model.

1  a car is a business entity identified by a vin with
2  a make, a model, a year (integer).
3  a car is related to a policy.
4
5  a customer is a business entity identified by an email with
6  a first name, a last name, an address, a mobile number, a gender.
7
8  a policy is a business entity identified by an id.
9  a policy is related to a car.
10 a policy is related to a customer.
11
12 a vehicle event is a business event time-stamped by
13 a date (date & time).
14 a vehicle event is related to a car.
15 a vehicle event is related to an incident.
16 a vehicle event has an address.
17
18 an accident is a vehicle event with a severity.
19
20 a severity can be one of: low, damage, injury, fatal.
21
22 an ambulance call is a business event time-stamped by a date.
23 an ambulance call has an address.
24 an ambulance call is related to a car.

TABLE 9-continued

Insurance data model.

25 an ambulance call is related to a customer.
26 an ambulance call has a description.

Table 10 shows a rule bot dialog for an airline example based on a blog post by Crowther and Can. The numbers refer to parts of the resulting BERL rule in Table 11, and the BMD data model is in Table 12. The data model illustrates entities whose fields are concepts that can in turn have fields of their own. The rule illustrates the defAct and setAct BERL actions for defining variables and setting fields of the persistent business entity, the airplane. Besides showcasing that the rule bot handles these features, the example also illustrates markdown-style quotes. The rule bot uses the quoted fragment '(_+_)/2' in Table 10, Line 35 to fill expr16. It turns each of the two underscores into new holes to fill, numbered expr18 and expr19. The elaborate nested expressions in this rule stretch the BERL CNL, making it feel more controlled and less natural. It is hard to imagine a business user authoring this rule without first learning BERL. In contrast, the basic approach of rule bot scales to longer dialog like this one with 28 utterances by the human (H).

TABLE 10

Airline example dialog.

1  C: Which input event should trigger the rule?
2  H: an airplane event
3  C: Ok, airplane event.
4  C: Is there a condition?
5  H: no
6  C: Ok the condition for this rule is empty
7  C: What kind of action would you like to add?
8  H: define "rpmAverage"
9  C: Ok, I'm adding a new definition for variable 'rpmAverage'.
10 C: What is kind of expression would you like to build (expr7)?
11 H: a division operation
12 C: Alright, let's build an division expression
13 C: What is the left operand of the '/' operator (expr8)?
14 H: plus
15 C: Alright, let's build an addition expression
16 C: What is the left operand of the '+' operator (expr10)?
17 H: a field
18 C: Ok, what property do you want to access?
19 H: the average engine rpm
20 C: From which expression do we get field 'average engine rpm' (expr12)?
21 H: the variable "the airplane"
22 C: What is the right operand of the '+' operator (expr11)?
23 H: the rpm property
24 C: From which expression do we get field 'rpm' (expr13)?
25 H: the engine field
26 C: From which expression do we get field 'engine' (expr14)?
27 H: this airplane
28 C: What is the right operand of the '/' operator (expr9)?
29 H: the integer 2
30 C: An integer with value 2
31 C: Any other action?
32 H: yes, define "pressureAverage"
33 C: Ok, I'm adding a new definition for variable 'pressureAverage'.
34 C: What is kind of expression would you like to build (expr16)?
35 H: '( + )/2'
36 C: What is the left operand of the '+' operator (expr18)?
37 H: a field access
38 C: Ok, what property do you want to access?
39 H: the average engine pressure ratio
40 C: From which expression do we get field
41 'average engine pressure ratio' (expr21)?
42 H: the variable "the airplane"
43 C: What is the right operand of the '+' operator (expr19)?
44 H: the pressure ratio field
45 C: From which expression do we get field 'pressure ratio' (expr22)?
46 H: the engine property

TABLE 10-continued

Airline example dialog.

47  C: From which expression do we get field 'engine' (expr23)?
48  H: this airplane
49  C: Any other action?
50  H: yes, set part of "the airplane"
51  C: Ok, let's add a set action for 'the airplane'.
52  C: Which field of 'the airplane' should be set?
53  H: the average engine rpm
54  C: Ok, I'm adding a new set action for the field
55  average engine rpm of variable 'the airplane'.
56  C: What is kind of expression would you like to build (expr25)?
57  H: the variable "rpmAverage"
58  C: Any other action?
59  H: yes, set another field of "the airplane"
60  C: Ok, let's add a set action for 'the airplane'.
61  C: Which field of 'the airplane' should be set?
62  H: the average engine pressure ratio field
63  C: Ok, I'm adding a new set action for the field
64  average engine pressure ratio of variable 'the airplane'.
65  C: What is kind of expression would you like to build (expr27)?
66  H: the "pressureAverage" variable
67  C: Any other action?
68  H: no
69  C: Do you accept the rule 1?
70  H: yes
71  C: The rule is confirmed.

TABLE 11

Airline event rule.

1   [{rule1}]
2   [{event2}when a airplane event occurs, called 'the airplane event']
3   [{cond3}]
4   [{actions4}then
5     [{action5}define 'rpmAverage' as
6       [{expr7}[{expr8}(
7         [{expr10}the average engine rpm of
8           [{expr12}'the airplane']]
9         + [{expr11}the rpm of [{expr13}the engine of
10          [{expr14}this airplane event]]])
11        / [{expr9}2]]];
12    [{action15}define 'pressureAverage' as
13      [{expr16}[{expr17}(
14        [{expr18}the average engine pressure ratio of
15          [{expr21}'the airplane']]
16        + [{expr19}the pressure ratio of
17          [{expr22}the engine of [{expr23}this airplane event]]])
18        / [{expr20}2]]];
19    [{action24}set the average engine rpm of 'the airplane'
20    to [{expr25}rpmAverage]];
21    [{action26}set the average engine pressure ratio of 'the airplane'
22    to [{expr27}pressureAverage]];]]

TABLE 12

Airline data model.

1   an airplane is a business entity identified by an airplane id.
2   an airplane has an average engine pressure ratio (integer).
3   an airplane has an average engine rpm (integer).
4   an airplane has an engine warnings (integer).
5
6   an airplane event is a business event time-stamped by
7   a timestamp (date & time).
8   an airplane event has an aircraft id.
9   an airplane event has an engine.
10
11  a engine is a concept.
12  an engine has a pressure ratio (integer).
13  an engine has a rpm (integer).

The three examples (credit card, insurance, and airline) demonstrate that the rule bot can handle a variety of rule (e.g., BERL) features and assist the user in authoring rules based on different data model (e.g., BMD) files. The rule bot can break down larger authoring tasks into small chunks such that the human utterances can be in colloquial English suitable for non-developers.

As described above, a conversational agent for authoring rules (also referred to as rule bot) is presented that conduct natural-language conversation for authoring event-processing rules. For example, rule bot conversations allow non-programmers to author non-trivial rules. The rule bot of the present disclosure is able to conduct a natural language conversation with a user and guides the user toward authoring a rule, providing help and error repair along the way.

Figure 19:
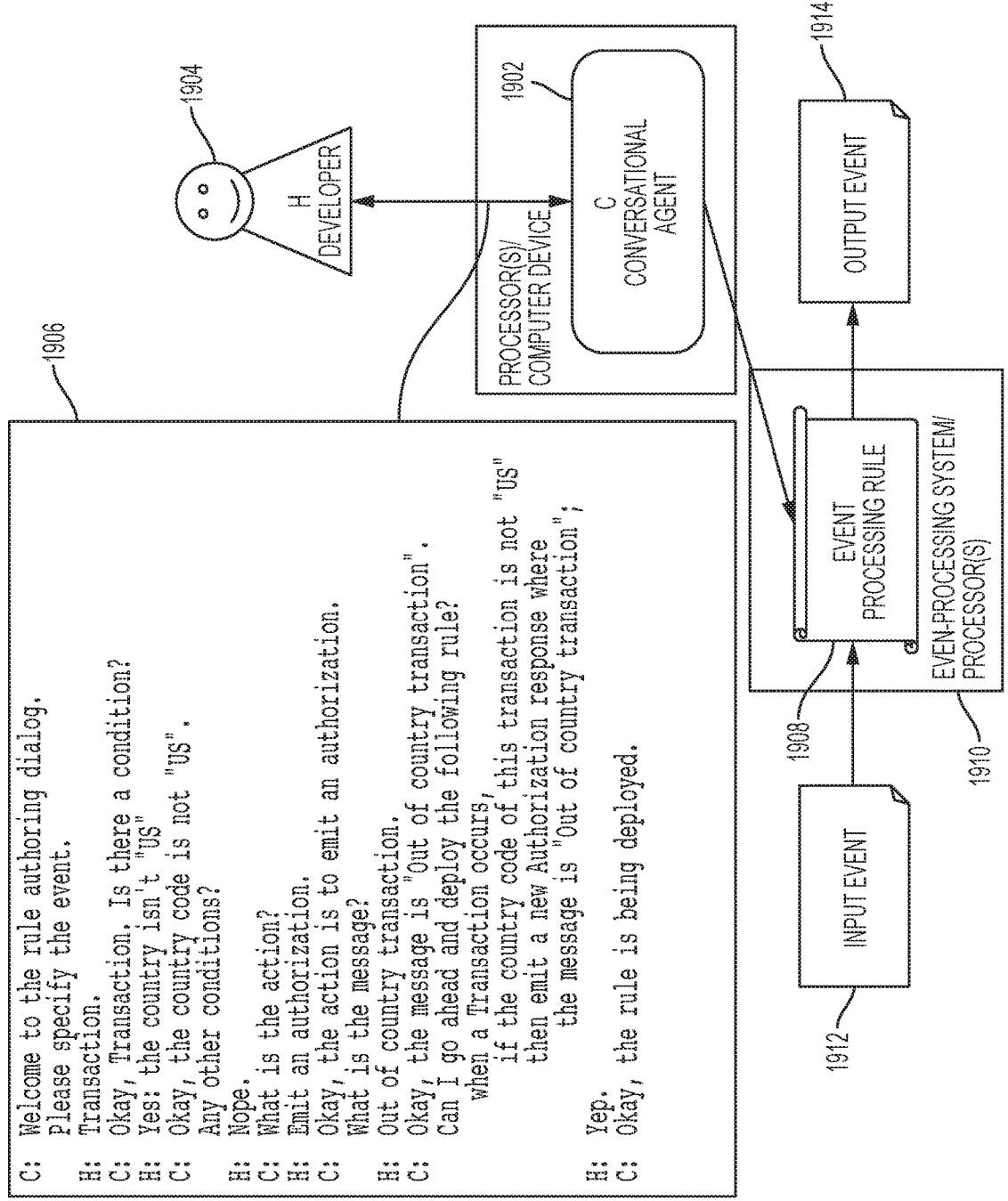
FIG. 19 shows an overview of a use case of a rule authoring conversational agent in one embodiment.

FIG. 19 shows an overview of a use case of a rule authoring conversational agent in one embodiment of the present disclosure. A conversation agent 1902 conducts a dialog with a user 1904 in natural language 1906. The conversation agent 1902 is a computer device including at least one hardware processor (or an application or module that runs on such a computer device) and autonomously conducts a natural language dialog or conversation with a user 1904. As a result, one or more rules 1908 are generated, which can be transmitted to an event-processing system 1910. The event-processing system 1910 runs on at least one hardware processor. For instance, an event-processing middle may be executing on one or more hardware processors. The event-processing system 1910 receives input events 1912. Based on the input events 1912, one or more rules 1908 may be triggered, and an output event may be generated 1914.

Figure 20:
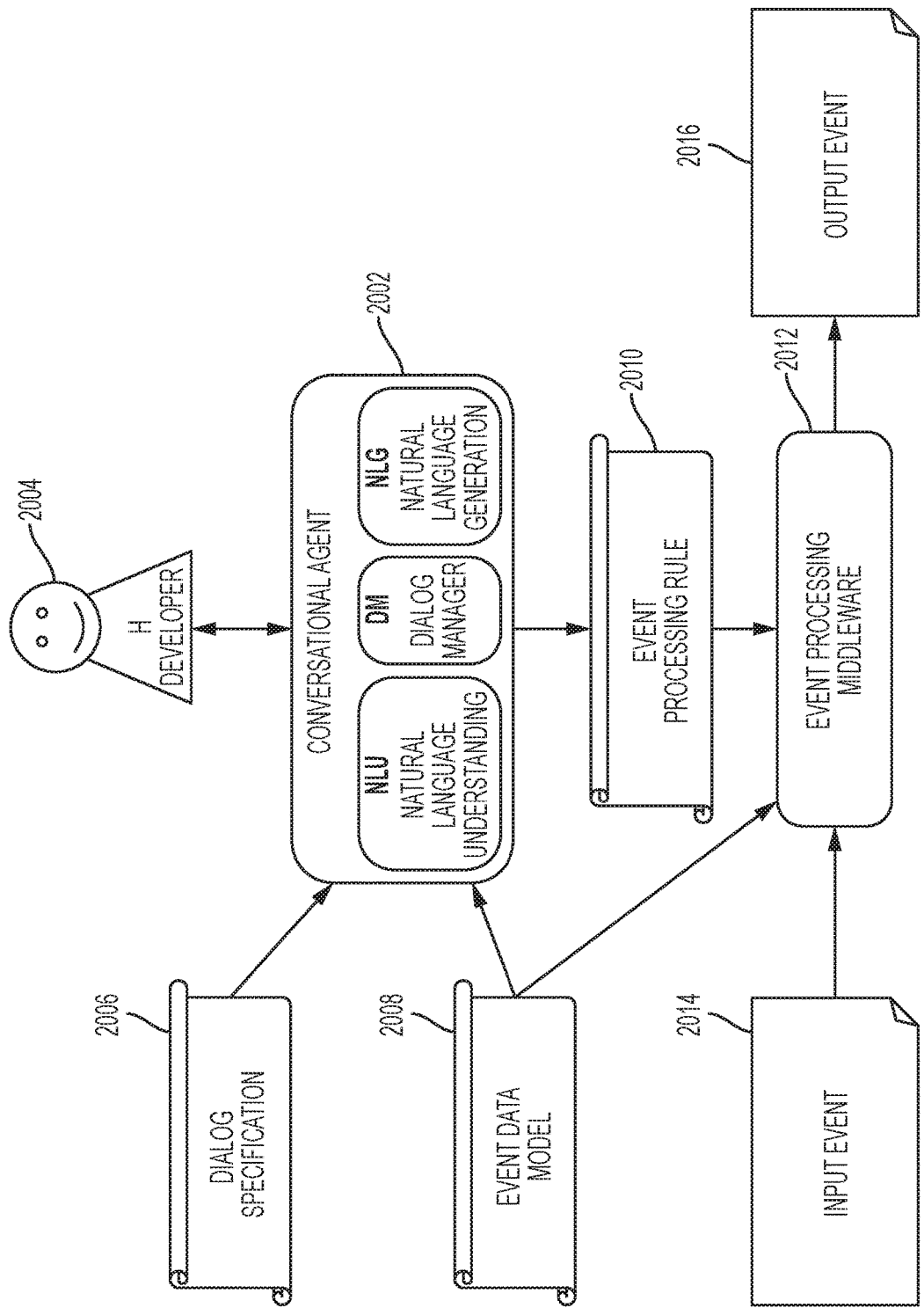
FIG. 20 is a diagram showing architecture of a conversational agent in one embodiment.

FIG. 20 is a diagram showing architecture of a conversational agent in one embodiment of the present disclosure. A conversation agent 2002 is a computer device including at least one hardware processor (or an application or module that runs on such a computer device) and autonomously conducts a natural language dialog or conversation with a user 2004. For example, the computer device may be coupled to devices such as a microphone and speaker for conversing with a user, for example, for receiving user's utterance such as voice input, and amplifying speech to the user. The conversational agent 2002 receives a dialog specification 2006 that specifies general structure of a rule, for example for authoring, for example, a grammar. The conversation agent 2002 also receives an event data model that specifies data objects for understanding user utterances. The dialog specification may be a dialog grammar, for example, shown in FIGS. 4 and 22. The event data model may be the BMD. The dialog specification drives the conversation structure, and the event data model contains information about the known entities and their relationships. The use of the event data model was described in Paragraph 47 (amended above). The dialog specification (grammar) in paragraph 51, and its use in paragraph 54. Based on the dialog specification 2006 and event data model 2008, the conversational agent 2002 conducts a dialog in natural language with a user 2004. For instance, the conversational agent 2002 may employ a natural language processing technique and employ NLU, DM, and NLG functionalities. In one embodiment, DM functions as the dialog controller that manages the state machines that direct the conversation flow.

Based on the conversation, the conversational agent builds an event processing rule 2010, which can be executed by an event processing middleware 2012 or the like. The event processing middleware 2012, for example, runs on one or more hardware processors. For example, as the event processing middleware 2012 receives its input event(s)

2014, the event processing rule 2010 may fire or trigger, for example, if the input event satisfies a criteria specified in the event processing rule 2010. Triggering of the event processing rule 2010 generates an output event 2016.

In one embodiment, for example, as described above, the conversational agent may be based on an event-processing platform such as ODM Insights. In this scenario, the event-processing platform 2012 may include ODM middleware. In such a scenario, the dialog specification 2006 may include a dialog grammar for event-condition-action rules, and the conversational agent 2002 may be based on WCS. In this scenario, the event data model 2008 may include dialog context specified as Business Object Model (BOM), and the event processing rule 2010, a dialog outcome, may be generated in the form of Business Rule Language (BRL).

Table 13 shows an example dialog grammar for event-condition-action rules in one embodiment of the present disclosure in the ODM scenario. The dialog outcome, an ODM BRL is shown in Table 14.

TABLE 13

Example dialog grammar.

| rule | : event condition* action; |
| event | : word &{validEvent(word)}; |
| condition | : field operator value; |
| field | : word &{validField(field, /event)}; |
| operator | : "is" | "is not" | "is more than"; |
| value | : number | word; |

TABLE 14

Figure 21:
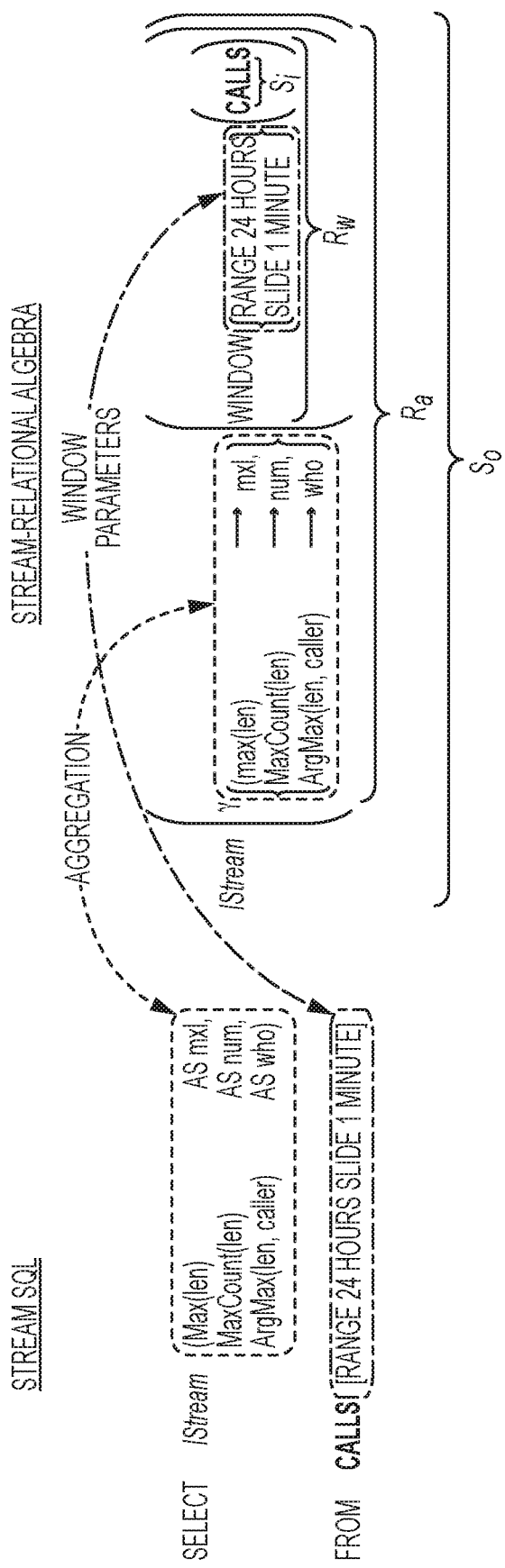
FIG. 21 shows an example of a dialog outcome generated in StreamSQL query in one embodiment.

Example dialog outcome.

when a Transaction occurs,
   if the country code of this transaction is not "US"
   then emit a new Authorization response where
      the message is "Out of country transaction";

In another embodiment, a conversational agent for authoring rules in natural language may be based on a query language such as StreamSQL. In this scenario, the dialog specification 2006 may include a dialog grammar for aggregation rules. The conversational agent 2002 may be based on WCS that employs natural language processing techniques. In this scenario, the event data model 2008 may include dialog context specified as StreamSQL tuple types, and the event processing rule 2010, a dialog outcome, may be generated in the form of StreamSQL query. The event processing middleware may include a streaming engine, for example, IBM® Streams. FIG. 21 shows an example of a dialog outcome generated in StreamSQL query in one embodiment of the present disclosure. Table 15 shows a conversation that is generated for building a query language rule in one embodiment of the present disclosure. Table 15 shows an example dialog for creating a Stream SQL query. FIG. 21 shows an outcome of the dialog in Table 15. The Stream SQL query can then be further translated into Stream-Relational Algebra (SRA) as shown in FIG. 21. SRA is an intermediate representation that expresses the meaning of the Stream SQL query at a lower level.

TABLE 15

Conversation

C: Please specify the event.
H: Calls.
C: Okay, Calls. Please specify the window.
H: Window size 24 hours and pane size 1 minute.
C: Okay, Range 24 Hours Slide 1 Minute. What aggregations?
H: Put the maximum of len in "mxl".
C: Okay, Max "len" as "mxl". Any other aggregations?
H: Calculate the maxCount of len and put it in "num".
C: Okay, MaxCount "len" as "num". Any other aggregations?
H: Calculate the argMax of "len" and caller into "who".
C: Okay, ArgMax of "len" and "caller" as "who". Any other aggregations?
H: No.
C: Okay, the specified rule is being deployed.

Figure 22:
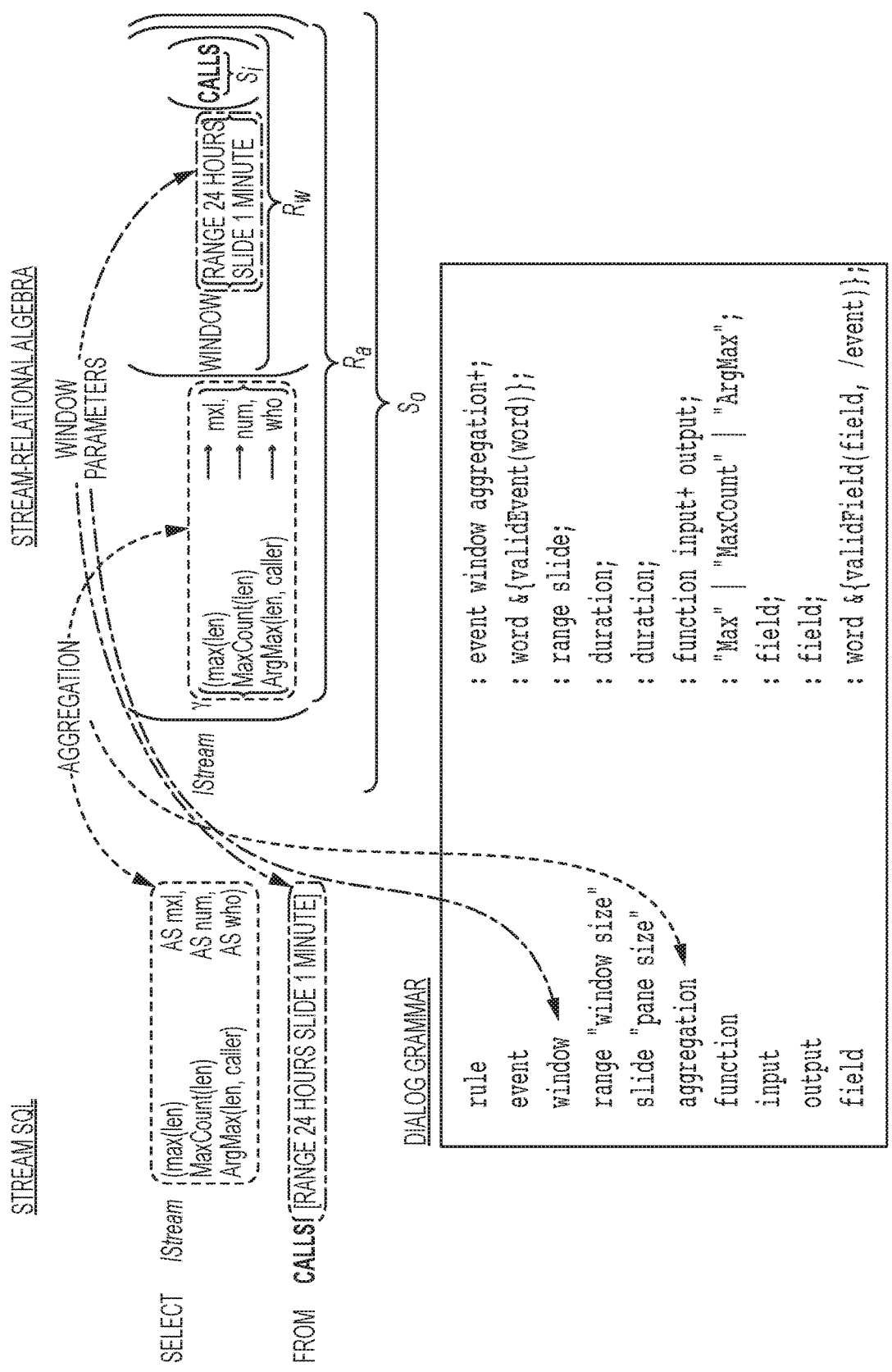
FIG. 22 shows an example grammar (dialog specification) provided to a conversational agent for generating a rule in query language in one embodiment.

FIG. 22 shows an example grammar (dialog specification) provided to a conversational agent for generating a rule in query language in one embodiment of the present disclosure. The arrows in FIG. 22 indicate which parts of the grammar are responsible for which part of the dialog. For instance, the aggregation non-terminal in the grammar collects a function name (such as Max), one or more input field names (such as len), and an output field name (such as mxl). Similarly, there is a direct correspondence between parts of the grammar and parts of the outcome for the window parameters.

A conversational agent of the present disclosure in one embodiment allows an author or user to specify an event-processing rule via a natural-language dialog. The conversational authoring environment guides the dialog with prompts and generates the event-processing rule, for example, in the format that can be executed or processed by an event-processing system. The generated event-processing rule is executed in the event-processing system and may be triggered or fired based on input events received by the event-processing input to the event-processing rule. The triggering of the rule may generate an output event. In one aspect, the natural language dialog may include multiple turns, for example, with the resulting rule being echoed back in controlled natural language or another language. Feedback, e.g., example outputs, alternative visualizations of the rules, may be integrated with the authoring environment. The dialog may also support a rule lifecycle management such deploying the rule and stopping the rule. In one aspect, rules can perform aggregation, rules can modify state. When a rule modifies a state, it updates data structures that are persisted between multiple rule invocations. For example, the rule may increment a counter stored in a database, and another rule may read that counter and incorporate its current value into its result. The conversation authoring environment may also detect potential ambiguity and provide repairs or correction.

Figure 23:
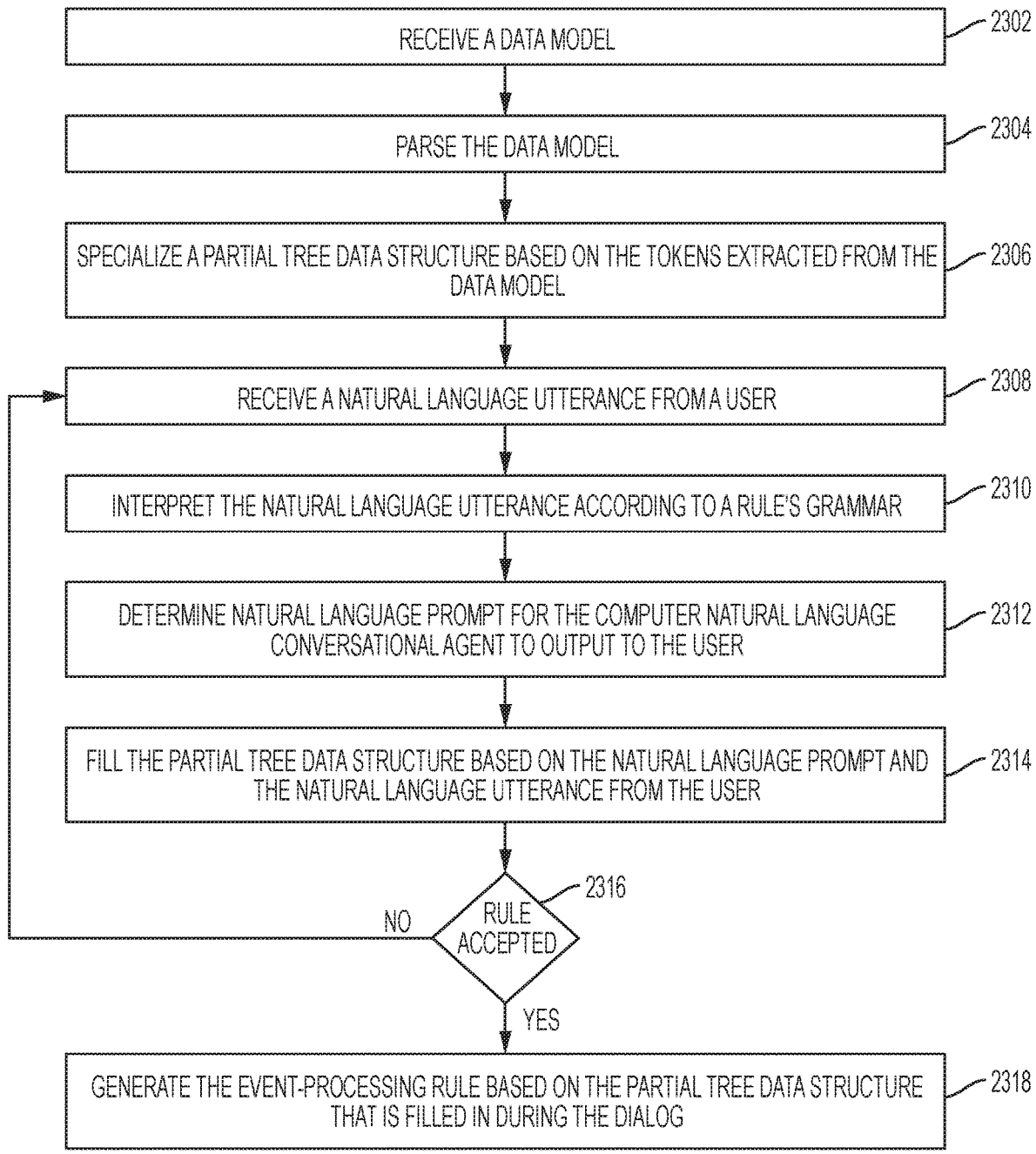
FIG. 23 is a flow diagram illustrating a method of authoring an event-processing rule in one embodiment.

FIG. 23 is a flow diagram illustrating a method of the present disclosure in one embodiment. At 2302, a data model that customizes a dialog and building of the event-processing rule is received. At 2304, the data model is parsed to extract tokens. At 2306, a partial tree data structure is constructed based on a rule's grammar, and specialized based on the tokens extracted from the data model. The partial tree data structure can be automatically constructed based on a grammar for the rule. The first non-terminal declared is used as the start state. The specialization based on the data model allows the rule bot to provide a customized interaction based on the data model. Specializing modifies or fills-in parts of the grammar that are not fully specified. For instance, a general conversation flow may be derived from the grammar, however, some information may be left out. The information that is left out may be determined based on the data model. For example, the set of known entities or fields may be extracted from the data model, and specialization augments the grammar with more information, when available.

Using an example shown in Table 1, consider lines 17-19 of Table 1 example:
17 C: Alright, let's build an greater than comparison
18 C: What is the left operand of the 'is more than' operator (expr12)?
19 H: get the amount property Knowledge that a "greater than" comparison is allowed here (line 17) and that a "property/field access" is allowed next (19) is due to the generic grammar for rules. The data model contains the list of known fields, which enables the methodology in one embodiment to determine that 'amount' is a valid field for this data model.

The example dialog in Table 10 uses a different data model. In that case, trying to build a "property/field access" operation is also allowed, but if the user tried to access the 'amount' property (for example, the user wrote line 19 (from table 1) verbatim, at an appropriate place in the dialogue (for example Table 10, replacing line 23)), it would result in an error, since 'amount' is not a valid field in that data model. The bot in one embodiment would respond with an error, and helpfully tell the user what the allowed field names are.

Similarly, the set of known entities and enumeration constants are also determined based on the data model. The data model for Table 1 is shown in Table 3. Note line 7: a transaction has an amount (a number). This line indicates that 'amount' is a valid field name. The data model for Table 10 is shown in Table 12. That example data model does not declare any entities that have an 'amount' field.

At 2308, a natural language utterance is received from a user. At 2310, the natural language utterance is interpreted according to the grammar, as specialized to the data model.

At 2312, based on the interpreting of the natural language utterance, the grammar, the data model, and the context (the previous interactions with the user), a natural language prompt is determined for the computer natural language conversational agent to output to the user.

At 2314, the partial tree data structure is filled based on the natural language prompt and the natural language utterance from the user. The steps at 2308, 2310, 2312 and 2314 may be repeated until the partial tree data structure represents a rule the user accepts, for example, carrying out a dialog in natural language according to the grammar and finite state machines.

At 2316, a confirmation that the user accepts the rule may be received from the user. This may be triggered by detecting that the rule is complete and is not missing any required parts.

At 2318, the event-processing rule is generated based on the partial tree data structure that is filled-in during the dialog.

Figure 24:
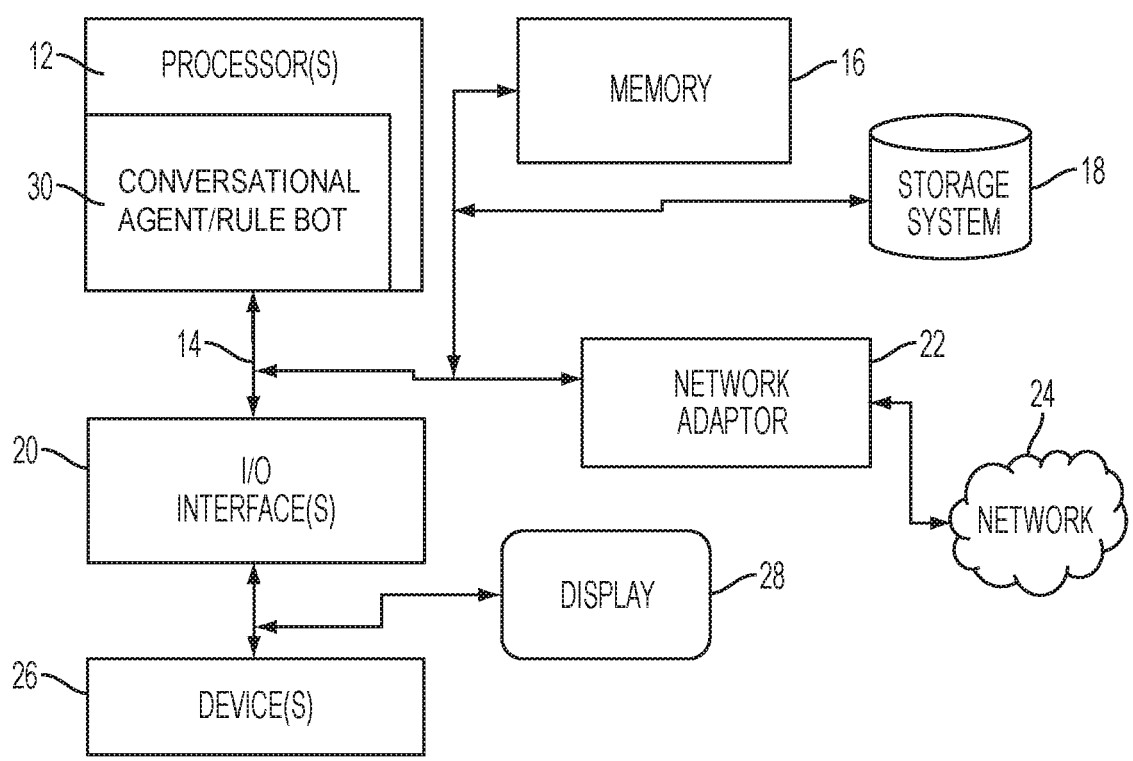
FIG. 24 illustrates a schematic of an example computer or processing system that may implement a natural language conversational agent system in one embodiment.

FIG. 24 illustrates a schematic of an example computer or processing system that may implement a rule authoring conversational agent system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 24 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a conversational agent module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of providing a computer natural language conversational agent that authors an event-processing rule, the method performed by at least one hardware processor, the method comprising:
    receiving a data model that customizes a dialog and building of the event-processing rule, the data model including at least entities and events, fields associated with the entities and events, and relationships associated with the entities and events;
    parsing the data model to extract tokens;
    constructing a partial tree data structure based on a grammar and specializing the partial tree data structure based on the tokens extracted from the data model, the partial tree data structure including at least nodes and edges representing a syntax tree (AST);
    receiving a natural language utterance from a user;
    interpreting the natural language utterance according to the grammar as specialized to the data model;
    determining based on the interpreting of the natural language utterance, the grammar, the data model, and context of interaction with the user, a natural language prompt for the computer natural language conversational agent to output to the user;
    filling the partial tree data structure based on the natural language prompt and the natural language utterance from the user, the filling including at least using separate data structures representing tree transformation including at least a replace instruction and an accept instruction, wherein the replace instruction swaps one subtree with a new subtree and the accept instruction changes a state of the subtree to be accepted;
    repeating the receiving of the natural language utterance, the interpreting of the natural language utterance, the determining of the natural language prompt, and the filling of the partial tree data structure until the nodes in the AST are filled and the partial tree data structure represents a rule the user accepts; and
    generating the event-processing rule based on the partial tree data structure that is filled, the event-processing rule provided as a controlled natural language (CNL), the event-processing rule comprising a computer language deployable to process an application event specified in the data model,
    wherein the computer natural language conversational agent engages the user in the dialog via the natural language prompt, allowing the user to program the event-processing rule via carrying on the dialog with the computer natural language conversational agent, without the user having to know how to program the event-processing rule.

2. The method of claim 1, further comprising transmitting the event-processing rule to an event-processing system, wherein based on an input event received in the event-processing system, the event-processing rule is triggered.

3. The method of claim 2, wherein the event-processing rule triggering in the event-processing system generates an event output automatically.

4. The method of claim 1, further comprising providing finite state machines that control a flow of the dialog in the interpreting of the natural language utterance and the determining of the natural language prompt.

5. The method of claim 1, wherein the conversational agent generates the event-processing rule in a controlled natural language form.

6. The method of claim 1, wherein the conversational agent generates the event-processing rule in a query language.

7. The method of claim 1, wherein the conversational agent further echoes back the event processing rule that is generated based on the partial tree data structure filled during the dialog, and requests confirmation from the user.

8. A computer program product comprising a computer readable storage medium having program instructions embodied therewith, the program instructions executable by a device to cause the device to:
    receive a data model that customizes a dialog and building of the event-processing rule, the data model including at least entities and events, fields associated with the entities and events, and relationships associated with the entities and events;
    parse the data model to extract tokens;
    construct a partial tree data structure based on a grammar and specializing the partial tree data structure based on the tokens extracted from data model, the partial tree data structure including at least nodes and edges representing a syntax tree (AST);
    receive a natural language utterance from a user;
    interpret the natural language utterance according to the grammar as specialized to the data model;
    determine based on the interpreting of the natural language utterance, the grammar, the data model, and context of interaction with the user, a natural language prompt for the computer natural language conversational agent to output to the user;
    fill the partial tree data structure based on the natural language prompt and the natural language utterance from the user, the filling including at least using separate data structures representing tree transformation including at least a replace instruction and an accept instruction, wherein the replace instruction swaps one subtree with a new subtree and the accept instruction changes a state of the subtree to be accepted;

repeat receiving of the natural language utterance, interpreting of the natural language utterance, determining of the natural language prompt, and filling of the partial tree data structure until the nodes in the AST are filled and the partial tree data structure represents a rule the user accepts; and generate the event-processing rule based on the partial tree data structure that is filled, the event-processing rule provided as a controlled natural language (CNL), the event-processing rule comprising a computer language deployable to process an application event specified in the data model, wherein the computer natural language conversational agent engages the user in the dialog via the natural language prompt, allowing the user to program the event-processing rule via carrying on the dialog with the computer natural language conversational agent, without the user having to know how to program the event-processing rule.

9. The computer readable storage device of claim 8, further comprising transmitting the event-processing rule to an event-processing system, wherein based on an input event received in the event-processing system, the event-processing rule is triggered.

10. The computer readable storage device of claim 9, wherein the event-processing rule triggering in the event-processing system generates an event output automatically.

11. The computer readable storage device of claim 8, further comprising providing finite state machines that control a flow of the dialog in the interpreting of the natural language utterance and the determining of the natural language prompt.

12. The computer readable storage device of claim 8, wherein the conversational agent generates the event-processing rule in a controlled natural language form.

13. The computer readable storage device of claim 8, wherein the conversational agent generates the event-processing rule in a query language.

14. The computer readable storage device of claim 8, wherein the conversational agent further echoes back the event processing rule that is generated based on the partial tree data structure filled during the dialog, and requests confirmation from the user.

15. A natural language conversational agent system, comprising:

a storage devices; and at least one hardware processor coupled to the storage device, the at least one hardware processor receiving a data model that customizes a dialog and building of the event-processing rule, the data model including at least entities and events, fields associated with the entities and events, and relationships associated with the entities and events;

the at least one hardware processor parsing the data model to extract tokens;

the at least one hardware processor constructing a partial tree data structure based on a grammar and specializing the partial tree data structure based on the tokens extracted from the data model, the partial tree data structure including at least nodes and edges representing a syntax tree (AST);

the at least one hardware processor receiving a natural language utterance from a user via a microphone coupled to the at least one hardware processor;

the at least one hardware processor interpreting the natural language utterance according to the grammar as specialized to the data model;

the at least one hardware processor determining based on the interpreting of the natural language utterance, the grammar, the data model, and context of interaction with the user, a natural language prompt for the computer natural language conversational agent to output to the user;

the at least one hardware processor filling the partial tree data structure based on the natural language prompt and the natural language utterance from the user, the filling including at least using separate data structures representing tree transformation including at least a replace instruction and an accept instruction, wherein the replace instruction swaps one subtree with a new subtree and the accept instruction changes a state of the subtree to be accepted;

the at least one hardware processor repeating the receiving of the natural language utterance, the interpreting of the natural language utterance, the determining of the natural language prompt, and the filling of the partial tree data structure until the nodes in the AST are filled and the partial tree data structure represents a rule the user accepts;

the at least one hardware processor generating the event-processing rule based on the partial tree data structure that is filled, the event-processing rule provided as a controlled natural language (CNL), the event-processing rule comprising a computer language deployable to process an application event specified in the data model, wherein the computer natural language conversational agent engages the user in the dialog via the natural language prompt, allowing the user to program the event-processing rule via carrying on the dialog with the computer natural language conversational agent, without the user having to know how to program the event-processing rule.

16. The system of claim 15, wherein the at least one hardware processor transmits the event-processing rule to an event-processing system, wherein based on an input event received in the event-processing system, the event-processing rule is triggered.

17. The system of claim 16, wherein the event-processing rule triggering in the event-processing system generates an event output automatically.

18. The system of claim 15, further comprising finite state machines that control a flow of the dialog in interpreting of the natural language utterance and determining of the natural language prompt.

19. The system of claim 15, wherein the conversational agent generates the event-processing rule in a controlled natural language form.

20. The system of claim 15, wherein the conversational agent generates the event-processing rule in a query language.

* * * * *